US012061622B1

(12) United States Patent
Arriaga

(10) Patent No.: US 12,061,622 B1
(45) Date of Patent: Aug. 13, 2024

(54) APPARATUS AND METHOD FOR COMMUNICATIONS ASSOCIATED WITH ONE OR MORE DATA SETS

(71) Applicant: Influential Lifestyle Insurance LLC, Scottsdale, AZ (US)

(72) Inventor: Jason Arriaga, Scottsdale, AZ (US)

( * ) Notice: Subject to any disclaimer, the term of this patent is extended or adjusted under 35 U.S.C. 154(b) by 0 days.

(21) Appl. No.: 18/231,562

(22) Filed: Aug. 8, 2023

(51) Int. Cl.
*G06F 7/00* (2006.01)
*G06F 16/2457* (2019.01)
*G06F 16/25* (2019.01)

(52) U.S. Cl.
CPC ........ *G06F 16/258* (2019.01); *G06F 16/2457* (2019.01)

(58) Field of Classification Search
CPC .. G06F 16/258; G06F 16/2457; G06F 16/332; G06F 16/903; G06F 16/3325; G06F 16/9537; G06F 16/9536; G06F 21/604; G06F 2221/2101; G06F 2201/81
See application file for complete search history.

(56) References Cited

U.S. PATENT DOCUMENTS

| | | | |
|---|---|---|---|
| 7,324,815 B2* | 1/2008 | Ross | H04W 24/00 455/425 |
| 11,263,588 B2* | 3/2022 | Agarwal | G06F 16/908 |
| 2004/0153514 A1* | 8/2004 | Crane | H04L 63/08 709/206 |
| 2004/0259614 A1* | 12/2004 | Machida | A63F 13/44 463/1 |
| 2022/0374558 A1* | 11/2022 | Patel | G06F 30/12 |
| 2022/0383186 A1* | 12/2022 | Adeli-Nadjafi | G06N 20/00 |

\* cited by examiner

*Primary Examiner* — Mohammad A Sana
(74) *Attorney, Agent, or Firm* — Caldwell Intellectual Property Law

(57) ABSTRACT

An apparatus for communication associated with one or more data sets, the apparatus having a processor and a memory communicatively connected to the processor, the memory containing instructions configuring the processor to retrieve a plurality of allies from a database, determine an eligibility status of each ally of the plurality of allies including receiving a data set having one or more target data and determining an eligibility status as a function of the data set, select at least one ally of the plurality of allies as a function of the eligibility status generate an optimized communication protocol as a function of the selection, and modify a graphical user interface as a function of the selection and the optimized communication protocol.

16 Claims, 8 Drawing Sheets

APPARATUS AND METHOD FOR COMMUNICATIONS ASSOCIATED WITH ONE OR MORE DATA SETS

FIELD OF THE INVENTION

The present invention generally relates to the field of communications. In particular, the present invention relates to communication protocols associated with one or more data sets.

BACKGROUND

Current systems used for determining eligibility are quite bare and do not consider multiple external factors. As a result, eligibility may only be determined using limited inputs and outputs. In addition, current systems used to determine eligibility do not provide for preferred communication channels.

SUMMARY OF THE DISCLOSURE

In an aspect an apparatus for communication associated with one or more data sets is described. The apparatus includes a processor and a memory communicatively connected to the processor. The memory contains instructions configuring the processor to retrieve a plurality of allies from a database, determine an eligibility status of each ally of the plurality of allies including receiving a data set having one or more sets of target data and determining an eligibility status as a function of the data set. The memory further contains instructions to select at least one ally of the plurality of allies as a function of the eligibility status, generate an optimized communication protocol as a function of the selection, and modify a graphical user interface as a function of the selection and the optimized communication protocol.

In another aspect a method for communication associated with one or more data sets is described. The method includes retrieving, by at least a processor, a plurality of allies from a database, determining, by the at least a processor, an eligibility status of each ally of the plurality of allies including receiving a data set having one or more sets of target data and determining an eligibility status as a function of the data set. The method further includes selecting, by the at least a processor, at least one ally of the plurality of allies as a function of the eligibility status, generating, by the at least a processor, an optimized communication protocol as a function of the selection and modifying, by the at least a processor, a graphical user interface as a function of the selection and the optimized communication protocol.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

Figure 1:
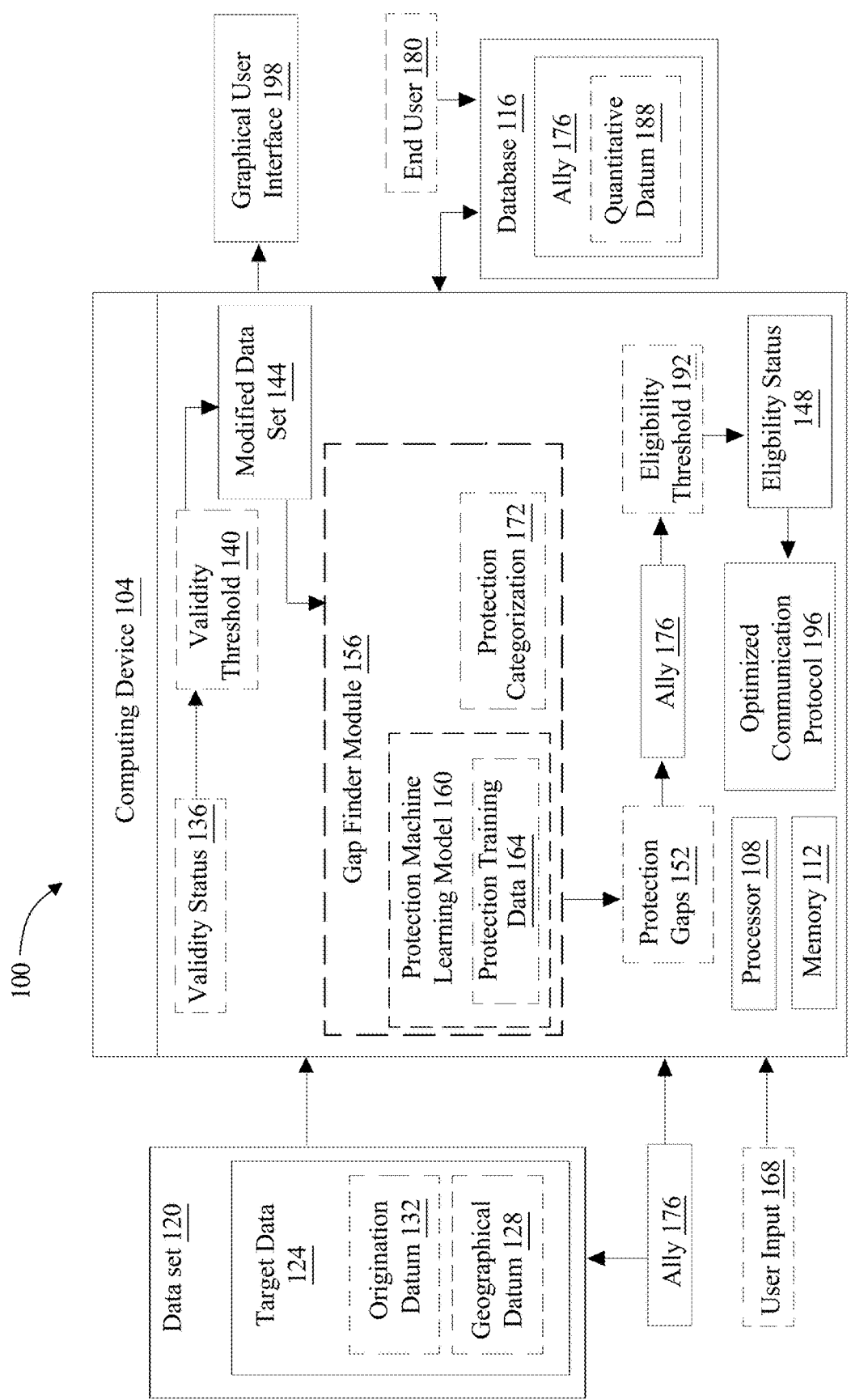
FIG. 1 is a block diagram of an exemplary embodiment of an apparatus for generating communication protocols associated with one or more data sets.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to systems and methods for communications associated with one or more data sets. In an embodiment, apparatus include a memory and a processor. In an embodiment, processor is configured to receive allies and determine their eligibility. In yet another embodiment, determining eligibility may include determining an eligibility status based on received data associated with one or more targets.

Aspects of the present disclosure can be used to ensure proper eligibility of allies. Aspects of the present disclosure can also be used to determine the eligibility of one or more allies and using one or more data sets. Aspects of the present disclosure can further be used to generate optimized communication protocols in order to determine the ideal communication preferences of an ally. Exemplary embodiments illustrating aspects of the present disclosure are described below in the context of several specific examples.

In an embodiment, methods and systems described herein may perform or implement one or more aspects of a cryptographic system. In one embodiment, a cryptographic system is a system that converts data from a first form, known as "plaintext," which is intelligible when viewed in its intended format, into a second form, known as "ciphertext," which is not intelligible when viewed in the same way. Ciphertext may be unintelligible in any format unless first converted back to plaintext. In one embodiment, a process of converting plaintext into ciphertext is known as "encryption." Encryption process may involve the use of a datum, known as an "encryption key," to alter plaintext. Cryptographic system may also convert ciphertext back into plaintext, which is a process known as "decryption." Decryption process may involve the use of a datum, known as a "decryption key," to return the ciphertext to its original plaintext form. In embodiments of cryptographic systems that are "symmetric," decryption key is essentially the same as encryption key: possession of either key makes it possible to deduce the other key quickly without further secret knowledge. Encryption and decryption keys in symmetric cryptographic systems may be kept secret and shared only with persons or entities that the user of the cryptographic system wishes to be able to decrypt the ciphertext. One example of a symmetric cryptographic system is the Advanced Encryption Standard ("AES"), which arranges plaintext into matrices and then modifies the matrices through repeated permutations and arithmetic operations with an encryption key.

In embodiments of cryptographic systems that are "asymmetric," either encryption or decryption key cannot be readily deduced without additional secret knowledge, even given the possession of a corresponding decryption or encryption key, respectively; a common example is a "public key cryptographic system," in which possession of the encryption key does not make it practically feasible to deduce the decryption key, so that the encryption key may safely be made available to the public. An example of a public key cryptographic system is RSA, in which an encryption key involves the use of numbers that are products of very large prime numbers, but a decryption key involves the use of those very large prime numbers, such that deducing the decryption key from the encryption key requires the practically infeasible task of computing the prime factors of a number which is the product of two very large prime numbers. Another example is elliptic curve cryptography, which relies on the fact that given two points P and Q on an elliptic curve over a finite field, and a definition for addition where A+B=−R, the point where a line connecting point A and point B intersects the elliptic curve, where "0," the identity, is a point at infinity in a projective plane containing the elliptic curve, finding a number k such that adding P to itself k times results in Q is computationally impractical, given correctly selected elliptic curve, finite field, and P and Q.

In some embodiments, systems and methods described herein produce cryptographic hashes, also referred to by the equivalent shorthand term "hashes." A cryptographic hash, as used herein, is a mathematical representation of a lot of data, such as files or blocks in a block chain as described in further detail below; the mathematical representation is produced by a lossy "one-way" algorithm known as a "hashing algorithm." Hashing algorithm may be a repeatable process; that is, identical lots of data may produce identical hashes each time they are subjected to a particular hashing algorithm. Because hashing algorithm is a one-way function, it may be impossible to reconstruct a lot of data from a hash produced from the lot of data using the hashing algorithm. In the case of some hashing algorithms, reconstructing the full lot of data from the corresponding hash using a partial set of data from the full lot of data may be possible only by repeatedly guessing at the remaining data and repeating the hashing algorithm; it is thus computationally difficult if not infeasible for a single computer to produce the lot of data, as the statistical likelihood of correctly guessing the missing data may be extremely low. However, the statistical likelihood of a computer of a set of computers simultaneously attempting to guess the missing data within a useful timeframe may be higher, permitting mining protocols as described in further detail below.

In an embodiment, hashing algorithm may demonstrate an "avalanche effect," whereby even extremely small changes to lot of data produce drastically different hashes. This may thwart attempts to avoid the computational work necessary to recreate a hash by simply inserting a fraudulent datum in data lot, enabling the use of hashing algorithms for "tamper-proofing" data such as data contained in an immutable ledger as described in further detail below. This avalanche or "cascade" effect may be evinced by various hashing processes; persons skilled in the art, upon reading the entirety of this disclosure, will be aware of various suitable hashing algorithms for purposes described herein. Verification of a hash corresponding to a lot of data may be performed by running the lot of data through a hashing algorithm used to produce the hash. Such verification may be computationally expensive, albeit feasible, potentially adding up to significant processing delays where repeated hashing, or hashing of large quantities of data, is required, for instance as described in further detail below. Examples of hashing programs include, without limitation, SHA256, a NIST standard; further current and past hashing algorithms include Winternitz hashing algorithms, various generations of Secure Hash Algorithm (including "SHA-1," "SHA-2," and "SHA-3"), "Message Digest" family hashes such as "MD4," "MD5," "MD6," and "RIPEMD," Keccak, "BLAKE" hashes and progeny (e.g., "BLAKE2," "BLAKE-256," "BLAKE-512," and the like), Message Authentication Code ("MAC")-family hash functions such as PMAC, OMAC, VMAC, HMAC, and UMAC, Poly 1305-AES, Elliptic Curve Only Hash ("ECOH") and similar hash functions, Fast-Syndrome-based (FSB) hash functions, GOST hash functions, the Grøstl hash function, the HAS-160 hash function, the JH hash function, the RadioGatún hash function, the Skein hash function, the Streebog hash function, the SWIFFT hash function, the Tiger hash function, the Whirlpool hash function, or any hash function that satisfies, at the time of implementation, the requirements that a cryptographic hash be deterministic, infeasible to reverse-hash, infeasible to find collisions, and have the property that small changes to an original message to be hashed will change the resulting hash so extensively that the original hash and the new hash appear uncorrelated to each other. A degree of security of a hash function in practice may depend both on the hash function itself and on characteristics of the message and/or digest used in the hash function. For example, where a message is random, for a hash function that fulfills collision-resistance requirements, a brute-force or "birthday attack" may to detect collision may be on the order of $O(2n/2)$ for n output bits; thus, it may take on the order of 2256 operations to locate a collision in a 512 bit output "Dictionary" attacks on hashes likely to have been generated from a non-random original text can have a lower computational complexity, because the space of entries they are guessing is far smaller than the space containing all random permutations of bits. However, the space of possible messages may be augmented by increasing the length or potential length of a possible message, or by implementing a protocol whereby one or more randomly selected strings or sets of data are added to the message, rendering a dictionary attack significantly less effective.

A "secure proof," as used in this disclosure, is a protocol whereby an output is generated that demonstrates possession of a secret, such as device-specific secret, without demonstrating the entirety of the device-specific secret; in other words, a secure proof by itself, is insufficient to reconstruct the entire device-specific secret, enabling the production of at least another secure proof using at least a device-specific secret. A secure proof may be referred to as a "proof of possession" or "proof of knowledge" of a secret. Where at least a device-specific secret is a plurality of secrets, such as a plurality of challenge-response pairs, a secure proof may include an output that reveals the entirety of one of the plurality of secrets, but not all of the plurality of secrets; for instance, secure proof may be a response contained in one challenge-response pair. In an embodiment, proof may not be secure; in other words, proof may include a one-time revelation of at least a device-specific secret, for instance as used in a single challenge-response exchange.

Secure proof may include a zero-knowledge proof, which may provide an output demonstrating possession of a secret while revealing none of the secret to a recipient of the output; zero-knowledge proof may be information-theoretically secure, meaning that an entity with infinite computing power would be unable to determine secret from output. Alternatively, zero-knowledge proof may be computationally secure, meaning that determination of secret from output is computationally infeasible, for instance to the same extent that determination of a private key from a public key in a public key cryptographic system is computationally infeasible. Zero-knowledge proof algorithms may generally include a set of two algorithms, a prover algorithm, or "P," which is used to prove computational integrity and/or possession of a secret, and a verifier algorithm, or "V" whereby a party may check the validity of P. Zero-knowledge proof may include an interactive zero-knowledge proof, wherein a party verifying the proof must directly interact with the proving party; for instance, the verifying and proving parties may be required to be online, or connected to the same network as each other, at the same time. Interactive zero-knowledge proof may include a "proof of knowledge" proof, such as a Schnorr algorithm for proof on knowledge of a discrete logarithm. In a Schnorr algorithm, a prover commits to a randomness r, generates a message based on r, and generates a message adding r to a challenge c multiplied by a discrete logarithm that the prover is able to calculate; verification is performed by the verifier who produced c by exponentiation, thus checking the validity of the discrete logarithm. Interactive zero-knowledge proofs may alternatively or additionally include sigma protocols. Persons skilled in the art, upon reviewing the entirety of this disclosure, will be aware of various alternative interactive zero-knowledge proofs that may be implemented consistently with this disclosure.

Alternatively, zero-knowledge proof may include a non-interactive zero-knowledge, proof, or a proof wherein neither party to the proof interacts with the other party to the proof; for instance, each of a party receiving the proof and a party providing the proof may receive a reference datum which the party providing the proof may modify or otherwise use to perform the proof. As a non-limiting example, zero-knowledge proof may include a succinct non-interactive arguments of knowledge (ZK-SNARKS) proof, wherein a "trusted setup" process creates proof and verification keys using secret (and subsequently discarded) information encoded using a public key cryptographic system, a prover runs a proving algorithm using the proving key and secret information available to the prover, and a verifier checks the proof using the verification key; public key cryptographic system may include RSA, elliptic curve cryptography, ElGamal, or any other suitable public key cryptographic system. Generation of trusted setup may be performed using a secure multiparty computation so that no one party has control of the totality of the secret information used in the trusted setup; as a result, if any one party generating the trusted setup is trustworthy, the secret information may be unrecoverable by malicious parties. As another non-limiting example, non-interactive zero-knowledge proof may include a Succinct Transparent Arguments of Knowledge (ZK-STARKS) zero-knowledge proof. In an embodiment, a ZK-STARKS proof includes a Merkle root of a Merkle tree representing evaluation of a secret computation at some number of points, which may be 1 billion points, plus Merkle branches representing evaluations at a set of randomly selected points of the number of points; verification may include determining that Merkle branches provided match the Merkle root, and that point verifications at those branches represent valid values, where validity is shown by demonstrating that all values belong to the same polynomial created by transforming the secret computation. In an embodiment, ZK-STARKS does not require a trusted setup.

Zero-knowledge proof may include any other suitable zero-knowledge proof. Zero-knowledge proof may include, without limitation bulletproofs. Zero-knowledge proof may include a homomorphic public-key cryptography (hPKC)-based proof. Zero-knowledge proof may include a discrete logarithmic problem (DLP) proof. Zero-knowledge proof may include a secure multi-party computation (MPC) proof. Zero-knowledge proof may include, without limitation, an incrementally verifiable computation (IVC). Zero-knowledge proof may include an interactive oracle proof (IOP). Zero-knowledge proof may include a proof based on the probabilistically checkable proof (PCP) theorem, including a linear PCP (LPCP) proof. Persons skilled in the art, upon reviewing the entirety of this disclosure, will be aware of various forms of zero-knowledge proofs that may be used, singly or in combination, consistently with this disclosure.

In an embodiment, secure proof is implemented using a challenge-response protocol. In an embodiment, this may function as a one-time pad implementation; for instance, a manufacturer or other trusted party may record a series of outputs ("responses") produced by a device possessing secret information, given a series of corresponding inputs ("challenges"), and store them securely. In an embodiment, a challenge-response protocol may be combined with key generation. A single key may be used in one or more digital signatures as described in further detail below, such as signatures used to receive and/or transfer possession of crypto-currency assets; the key may be discarded for future use after a set period of time. In an embodiment, varied inputs include variations in local physical parameters, such as fluctuations in local electromagnetic fields, radiation, temperature, and the like, such that an almost limitless variety of private keys may be so generated. Secure proof may include encryption of a challenge to produce the response, indicating possession of a secret key. Encryption may be performed using a private key of a public key cryptographic system, or using a private key of a symmetric cryptographic system; for instance, trusted party may verify response by decrypting an encryption of challenge or of another datum using either a symmetric or public-key cryptographic system, verifying that a stored key matches the key used for encryption as a function of at least a device-specific secret. Keys may be generated by random variation in selection of prime numbers, for instance for the purposes of a cryptographic system such as RSA that relies prime factoring difficulty. Keys may be generated by randomized selection of parameters for a seed in a cryptographic system, such as elliptic curve cryptography, which is generated from a seed. Keys may be used to generate exponents for a cryptographic system such as Diffie-Helman or ElGamal that are based on the discrete logarithm problem.

Keys may be generated by random variation in selection of prime numbers, for instance for the purposes of a cryptographic system such as secret that relies prime factoring difficulty. Keys may be generated by randomized selection of parameters for a seed in a cryptographic system, such as elliptic curve cryptography, which is generated from a seed. Keys may be used to generate exponents for a cryptographic system such as Diffie-Helman or ElGamal that are based on the discrete logarithm problem.

Cryptographic system may be configured to generate a session-specific secret. Session-specific secret may include a secret, which may be generated according to any process as described above, that uniquely identifies a particular instance of an attested boot and/or loading of software monitor. Session-specific secret may include without limitation a random number. Session-specific secret may be converted to and/or added to a secure proof, verification datum, and/or key according to any process as described above for generation of a secure proof, verification datum, and/or key from a secret or "seed"; session-specific secret, a key produced therewith, verification datum produced therewith, and/or a secure proof produced therewith may be combined with module-specific secret, a key produced therewith, a verification datum produced therewith, and/or a secure proof produced therewith, such that, for instance, a software monitor and/or other signed element of attested boot and/or attested computing may include secure proof both of session-specific secret and of module-specific secret. In an embodiment, session-specific secret may be usable to identify that a given computation has been performed during a particular attested session, just as device-specific secret may be used to demonstrate that a particular computation has been produced by a particular device. This may be used, e.g., where secure computing module and/or any component thereof is stateless, such as where any such element has no memory that may be overwritten and/or corrupted.

A "digital signature," as used herein, includes a secure proof of possession of a secret by a signing device, as performed on provided element of data, known as a "message." A message may include an encrypted mathematical representation of a file or other set of data using the private key of a public key cryptographic system. Secure proof may include any form of secure proof as described above, including without limitation encryption using a private key of a public key cryptographic system as described above. Signature may be verified using a verification datum suitable for verification of a secure proof; for instance, where secure proof is enacted by encrypting message using a private key of a public key cryptographic system, verification may include decrypting the encrypted message using the corresponding public key and comparing the decrypted representation to a purported match that was not encrypted; if the signature protocol is well-designed and implemented correctly, this means the ability to create the digital signature is equivalent to possession of the private decryption key and/or device-specific secret. Likewise, if a message making up a mathematical representation of file is well-designed and implemented correctly, any alteration of the file may result in a mismatch with the digital signature; the mathematical representation may be produced using an alteration-sensitive, reliably reproducible algorithm, such as a hashing algorithm as described above. A mathematical representation to which the signature may be compared may be included with signature, for verification purposes; in other embodiments, the algorithm used to produce the mathematical representation may be publicly available, permitting the easy reproduction of the mathematical representation corresponding to any file.

in some embodiments, digital signatures may be combined with or incorporated in digital certificates. In one embodiment, a digital certificate is a file that conveys information and links the conveyed information to a "certificate authority" that is the issuer of a public key in a public key cryptographic system. Certificate authority in some embodiments contains data conveying the certificate authority's authorization for the recipient to perform a task. The authorization may be the authorization to access a given datum. The authorization may be the authorization to access a given process. In some embodiments, the certificate may identify the certificate authority. The digital certificate may include a digital signature.

In some embodiments, a third party such as a certificate authority (CA) is available to verify that the possessor of the private key is a particular entity; thus, if the certificate authority may be trusted, and the private key has not been stolen, the ability of an entity to produce a digital signature confirms the identity of the entity and links the file to the entity in a verifiable way. Digital signature may be incorporated in a digital certificate, which is a document authenticating the entity possessing the private key by authority of the issuing certificate authority and signed with a digital signature created with that private key and a mathematical representation of the remainder of the certificate. In other embodiments, digital signature is verified by comparing the digital signature to one known to have been created by the entity that purportedly signed the digital signature; for instance, if the public key that decrypts the known signature also decrypts the digital signature, the digital signature may be considered verified. Digital signature may also be used to verify that the file has not been altered since the formation of the digital signature.

Referring now to FIG. 1, apparatus 100 for generating communication protocols associated with one or more data sets is described. Apparatus 100 includes a computing device 104. Apparatus 100 includes a processor 108. Processor 108 may include, without limitation, any processor 108 described in this disclosure. Processor 108 may be included in a and/or consistent with computing device 104. Computing device 104 may include any computing device as described in this disclosure, including without limitation a microcontroller, microprocessor, digital signal processor (DSP) and/or system on a chip (SoC) as described in this disclosure. Computing device 104 may include, be included in, and/or communicate with a mobile device such as a mobile telephone or smartphone. Computing device 104 may include a single computing device 104 operating independently or may include two or more computing devices operating in concert, in parallel, sequentially or the like; two or more computing devices may be included together in a single computing device 104 or in two or more computing devices. Computing device 104 may interface or communicate with one or more additional devices as described below in further detail via a network interface device. Network interface device may be utilized for connecting computing device 104 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device 104. Computing device 104 may include but is not limited to, for example, a computing device 104 or cluster of computing devices in a first location and a second computing device 104 or cluster of computing devices in a second location. Computing device 104 may include one or more computing devices dedicated to data storage, security, distribution of traffic for load balancing, and the like. Computing device 104 may distribute one or more computing tasks as described below across a plurality of computing devices of computing device 104, which may operate in parallel, in series, redundantly, or in any other manner used for distribution of tasks or memory 112 between computing devices. Computing device 104 may be implemented, as a non-limiting example, using a "shared nothing" architecture.

With continued reference to FIG. 1, computing device 104 may be designed and/or configured to perform any method, method step, or sequence of method steps in any embodiment described in this disclosure, in any order and with any degree of repetition. For instance, computing device 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Computing device 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 1, computing device 104 may perform determinations, classification, and/or analysis steps, methods, processes, or the like as described in this disclosure using machine-learning processes. A "machine-learning process," as used in this disclosure, is a process that automatedly uses a body of data known as "training data" and/or a "training set" (described further below in this disclosure) to generate an algorithm that will be performed by a Processor module to produce outputs given data provided as inputs; this is in contrast to a non-machine learning software program where the commands to be executed are determined in advance by a user and written in a programming language. A machine-learning process may utilize supervised, unsupervised, lazy-learning processes and/or neural networks, described further below.

With continued reference to FIG. 1, apparatus 100 includes a memory 112 communicatively connected to processor 108. As used in this disclosure, "communicatively connected" means connected by way of a connection, attachment, or linkage between two or more relata which allows for reception and/or transmittance of information therebetween. For example, and without limitation, this connection may be wired or wireless, direct, or indirect, and between two or more components, circuits, devices, systems, and the like, which allows for reception and/or transmittance of data and/or signal(s) therebetween. Data and/or signals therebetween may include, without limitation, electrical, electromagnetic, magnetic, video, audio, radio, and microwave data and/or signals, combinations thereof, and the like, among others. A communicative connection may be achieved, for example and without limitation, through wired or wireless electronic, digital, or analog, communication, either directly or by way of one or more intervening devices or components. Further, communicative connection may include electrically coupling or connecting at least an output of one device, component, or circuit to at least an input of another device, component, or circuit. For example, and without limitation, using a bus or other facility for intercommunication between elements of a computing device 104. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure.

Still referring to FIG. 1, apparatus 100 may include a database 116. Database 116 may be implemented, without limitation, as a relational database, a key-value retrieval database such as a NOSQL database, or any other format or structure for use as database that a person skilled in the art would recognize as suitable upon review of the entirety of this disclosure. Database may alternatively or additionally be implemented using a distributed data storage protocol and/or data structure, such as a distributed hash table or the like. Database 116 may include a plurality of data entries and/or records as described above. Data entries in database may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in database may store, retrieve, organize, and/or reflect data and/or records.

Still referring to FIG. 1, apparatus includes data sets 120, target data 124, geographical datums 128, origination datums 136, validity thresholds 14, modified data sets 144, eligibility statuses 148, protection gaps 152, gap finder modules 156, protection machine learning models 160, protection training data, 164, user inputs 168, protection categorizations 172 and the like as will be described in further detail below.

With continued reference to FIG. 1, processor 108 is configured to retrieve a plurality of allies 176 from a database 116. "Ally," for the purposes of this disclosure, is a dataset containing information about a particular individual. In one or more embodiments, ally 176 may include a financial advisor. In one or more embodiments, ally 176 may include an individual who is tasked with assisting a target (as described in further detail below with services such as but not limited to finding insurance, managing the insurance, providing recommendations on an individual's assets and the like. In one or more embodiments, the financial advisor may assist the target in finding protection that is associated with one or more protection gaps 152 (as described in further detail below). In one or more embodiments, ally 176 may include any individual that may assist a target with any information within target data (as described in further detail below). This may include help such as financial advice involving a particular asset, guidance on particular insurance plans, and the like. In one or more embodiments, ally 176 may include basic information about the individual such as a name, an association with a particular entity, the education background of an individual, the experience of the individual (e.g. experience involving particular financial matters), the licenses of the individual (e.g.

CPA license, law license, etc.) and the like. In one or more embodiments, ally 176 may include preferred methods of communication, such as through audio, video, over email, and the like. In one or more embodiments, ally 176 may further include information about an end user 180. "End user," for the purposes of this disclosure, is an individual associated with one of the many allies 176. For example, end user 180 may include a particular individual identified and/or described within a particular ally 176. In one or more embodiments, ally 176 may include information about the individual such as the IP address of the end user 180, the phone number of the end user 180, a particular web link to communicate with the individual and the like. In one or more embodiments, each ally 176 may be classified to and/or associated with a particular protection categorization (as described in further detail below). For example, each ally 176 may include particular protections categorizations that the individual holds themselves as out to be proficient in. For example, personal items may require one type of insurance coverage, property and land may require another form of coverage, cars may require another form of coverage and the like. Similarly, employing domestic staff may require a differing form of coverage such as vehicle insurance. In one or more embodiments, protection categorization may include groupings such as, personal items, vehicles, property, persons (e.g. life insurance for a target, workers compensation insurance for a worker, slip and fall insurance for a guest and any other insurance that may be used to cover damages that occurred to an individual) and the like. In one or more embodiments, each protection categorization may be configured to satisfy a particular category of insurance and/or protection that may help protect the assets of a target. This may include, but is not limited to, property insurance (e.g. properties insured from accidents such as flooding, fires, tornadoes etc.), liability insurance (e.g., damages occurred to another individual as a result of the target's negligence) and reputation insurance (e.g. risks associated with cyber-attacks, risks associated with a target's business and the like). In one or more embodiments, an end user 180 may input one or more protection categorizations that they are proficient in. For example, a particular ally 176 may include information indicating that the end user 180 is proficient in asset management or a particular type of asset. In an embodiment, protection categorization may be used to determine whether a particular ally 176 is a good fit for a particular target. In an embodiment, protection categorizations may represent specialties of the ally 176, wherein the ally 176 may hold themselves out as being proficient in that area. In one or more embodiments, protection categorization may allow for individuals who are proficient within a particular area to assist with the one or more protection gaps 152 that are within modified data set 144 (as described in further detail below). In one or more embodiments, each ally 176 may further include goals of each ally. The goals may include but are not limited to, personal achievements associated with the particular ally, achievements the ally hopes to accomplish in the future and the like. In an embodiment, the goals may be used to determine the trajectory of a particular ally 176 and what steps or implementations may be made by system administrator (as described below) in order to achieve those goals.

With continued reference to FIG. 1, database 116 may be populated with a plurality of allies 176 in database 116 wherein each ally 176 may be associated to an end user 180 as described above. In one or more embodiments, processor 108 may be configured to receive one or more allies 176 from one or more end users 180. In one or more embodiments, receipt of one or more allies 176 may be done through a user interface as described below and through any other input methods as described in this disclosure. In one or more embodiments, each ally 176 may be input through a remote device that is separate and/or distinct from computing device 104. In one or more embodiments, each end user 180 may be configured to input one or more data elements within ally 176 as described above. In one or more embodiments, each end user 180 may be configured to submit signed documents such as non-disclosure agreements, agreement contracts and any other information that may be used to engage in association with an entity associated with management of apparatus 100. In one or more embodiments, apparatus 100 may serve as a central hub for multiple entities to engage in communication with one or more targets and/or individuals wherein each entity must agree to various terms, contract agreements and the like. In one or more embodiments, each end user 180 may be configured to input their expertise, their credentials and any other information that may be used to determine the eligibility of a particular end user 180 in association with communication. In one or more embodiments, processor 108 may be configured to receive an ally 176 from an end user 180 and transmit the ally 176 to database 116. In one or more embodiments, processor 108 may be configured to receive a set of data containing more than one allies 176 wherein each ally 176 may be associated with an end user 180. In one or more embodiments, processor 108 may be configured to receive a quantitative datum 188 from one or more end users 180. "Quantitative datum" for the purposes of this disclosure is a numerical element (e.g., 1, 2, 3, 10%, 20%, ⅖, ⅗ and the like) that may be used to determine a level of familiarity with a particular informative element. For example, quantitative datum 188 may include a number such as 5 wherein the number 5 out of a particular scaling of 5 may indicate a high association with a particular informative element. "Informative element" is a statement or question that may request a particular quantitative datum in order to determine an individual's familiarity or association with a particular topic. For example, informative element may include a question such as "how familiar are you with boat insurance" wherein a corresponding quantitative datum 188 may indicate an individual's familiarity. Continuing, a '1' may indicate that the individual is not familiar and a '5' may indicate that the individual is familiar in comparison to a scale of 1-5. In one or more embodiments, quantitative datum maybe associated with a score such as a score indicating an end user's 180 and/or ally's communication skills. For example, an ally may contain the requisite communication skills to communicate with other individuals such as targets as described below. In one or more embodiments, targets may be configured to input a score associated with the end user 180 and/or ally 176 wherein the quantitative datum 188 may be representative of the scores received. In one or more embodiments, quantitative datum 188 may include one or more scores and/or review associated with one or more targets within data set 120. In an embodiment, each target may be requested to input a score for their respective ally 176 wherein the scores may be representative of the capabilities of the ally 176. In one or more embodiments, quantitative datum 188 may be representative of a plurality of numerical elements, wherein each element corresponds to a particular target data 124. In one or more embodiments, the numerical element may include a number, such as for example, 1-5, wherein the number may be indicative of the capabilities of the ally 176. In one or more embodiments, quantitative datum 188 may represent the plurality of numerical elements either as a mean, an average, or any other mathematical computations. In one or more embodiments, the numerical elements may be used to determine the eligibility status 148 of the ally 176. In one or more embodiments, quantitative datum 188 may be associated to informative elements such as familiarity with protection gaps 152, expertise in client confidentiality, expertise in particular insurance plans, expertise in portfolio management, expertise in asset management, familiarity with the guidelines and/or protocols associated with apparatus 100, familiarity with various datum that may be present and or that is more prevalent within modified data set 144 and the like. This may include protection gaps 152, various insurance coverages or requirements thereof, familiarity with various assets, and the like. In one or more embodiments, processor 108 may receive a plurality of informative elements from a database 116 and request through a user interface, one or more quantitative datums 188 that are associated with the informative elements. For example, a user interface may include a question asking an end user 180 asking them on a scale of 1-5 how much their expertise aligns with the expertise of a particular topic wherein the end user 180 may input a quantitative datum 188 of 4 indicating a higher familiarity. In one or more embodiments, processor 108 may be configured to receive at least one, or a plurality of, quantitative datums 188 and input them into each ally 176. In one or more embodiments one or more quantitative datums 188 may be received and/or inputted by an individual other than the end user 180 associated with the ally 176. For example, processor 108 may request and/or receive inputs from targets and/or other end users 180 that have communicated or associated with the particular end user 180 identified within ally 176. In one or more embodiments, processor 108 may receive a rating of a particular ally 176 wherein the rating may be used to determine how effective the ally 176 is communication, or their work product. In one or more embodiments, each ally 176 may include a rating on their interpersonal and communicative skills from other targets. In one or more embodiments, processor 108 may be configured to generate an average using an algorithmic logic unit to generate an average of all ratings received by all targets or other end users 180. In an embodiment, rating may be used to determine whether a particular ally 176 is suitable for communication with a system administrator.

"System administrator" for the purposes of this disclosure is an individual who is responsible for managing or using a particular system, apparatus 100 or software. In one or more embodiments, system administrator may include an individual who oversees one or more determinations made by processor 108 and/or apparatus 100. In one or more embodiments, system administrator may include an individual who is interested in communication with an end user 180 following processing of one or more data as described in this disclosure. In one or more embodiments, system administrator may include an individual, such as an insurance agent, an insurance entity or any other individual to entity that may gain from communications with a particular end user 180. In one or more embodiments, determinations and/or outputs made by apparatus 100 may be used by system administrator to determine whether a particular ally 176 or end user is suitable for communication. In one or more embodiments, system administrator may contact ally in order to offer ally one or more products that may be used in connection with their profession. This may include but is not limited to, products that the ally 176 and/or end user may offer their clients or target.

With continued reference to FIG. 1, processor 108 is configured to determine an eligibility status 148 for each ally 176 of the plurality of allies 176. "Eligibility status" for the purposes of this disclosure is a determination that is made following comparison of one or more datum with each ally 176 to one or more predetermined thresholds. For example, eligibility status 148 may include datum indicating "eligible" or "ineligible" following one or more comparisons of ally 176 to one or more predetermined thresholds. Continuing, a predetermined threshold may require the presence of a particular element or datum within ally 176 wherein absence of the element may indicate failure to meet a particular threshold. As a result, the corresponding eligibility status 148 may include information indicating that a particular ally 176 did not meet one or more thresholds. In one or more embodiments, eligibility status 148 may be binary wherein eligibility status 148 may indicate if a particular ally 176 is eligible or non-eligible through one or more data. In one or more embodiments, eligibility status 148 may include information such as which elements with a particular ally 176 have met a particular threshold and which elements have not been met. For example, eligibility status 148 may include information that a first threshold had not been met whereas a second threshold had been met. In one or more embodiments, eligibility status 148 may be used to determine if communication should be made. In one or more embodiments, eligibility status 148 may be used to determine that a particular ally has input the requisite information. In one or more embodiments, eligibility status 148 may indicate if a particular ally is suitable for communication in regard to one or more insurance plans. In one or more embodiments, an ally 176 may contain one or more clients (also referred to herein as 'targets') wherein eligibility status 148 may indicate if a particular ally's clients are the particular type of clients that may require a particular insurance.

In one or more embodiments, the predetermined thresholds may include eligibility thresholds 192. "Eligibility thresholds" for the purposes of this disclosure are a set of parameters that must be met or exceeded in order to determine if a particular ally 176 is suitable for further processing. For example, if a particular ally 176 exceeds one or more eligibility thresholds 192, processor 108 may determine that the ally 176 is fit for further processing and communication. In one or more embodiments, eligibility thresholds 192 may include requirements that a particular datum be present within an ally 176. This may include various contract agreements, nondisclosure agreements and the like. In one or more embodiments, eligibility thresholds 192 may include minimum quantitative datums 188 that may be associated with each informative element. For example, an ally 176 may contain a '3' for a particular informative element wherein eligibility threshold 192 may include a 4, wherein the 4 may signify that an ally 176 requires a 4 in order to exceed the particular eligibility threshold 192. In one or more embodiments, a plurality of eligibility thresholds 192 may exist wherein each eligibility threshold 192 may be associated with a particular datum within ally 176. In one or more embodiments, processor 108 may be configured to compare each datum to each threshold wherein the absence of a particular datum within ally 176 or the lack of expertise as indicated by the quantitative datum 188 may indicate that a particular threshold has not been met or exceeded. In one or more embodiments, an eligibility status 148 associated an ally 176 may be 'ineligible' if even one datum has not met a particular threshold. In one or more embodiments, particular datum, such as the presence of non-disclosure agreements, may require presence in order to be eligible. In other cases, eligibility may be determined based on the failure or passing of one or more eligibility thresholds 192. For example, processor 108 may be configured to determine eligibility status 148 when a portion of elements within ally 176 have met a threshold. For example, in situations wherein 60% of a particular set of elements have met or exceeded a threshold, then an eligibility status 148 may be determined. In one or more embodiments, eligibility status 148 may be determined based on the presence of a particular datum, validity status 136, and the like within data set 120 and/or within modified data set 144 and the end user 180's familiarity with the datum as indicated by the quantitative datum 188. For example, a particular target may have a protection gap 152 in association to a boat, wherein a particular threshold relating to boats may be used to determine eligibility status 148. In one or more embodiments, a particular ally 176 may be given a positive eligibility status 148 for one target and a negative eligibility status 148 for another target. In one or more embodiments, eligibility status 148 may be determined based upon the receipt of payment. For example, eligibility of each ally 176 may require payment wherein an absence of payment may automatically consider an ally 176 ineligible. In one or more embodiments, processor 108 may receive a plurality of allies 176 and select one or more allies 176 based on eligibility status 148. In one or more embodiments, processor 108 may be configured to receive one or more allies 176. In one or more embodiments, processor 108 may be configured to select the ally 176 containing the highest eligibility status 148 as indicated by the comparison to one or more eligibility thresholds 192. For example, a particular ally 176 exceeding 5 thresholds may be selected over an ally 176 exceedingly only 3. In one or more embodiments, processor may be configured to determine an eligibility status 148 of one or more allies 176 wherein each ally that is deemed 'eligible' may be selected for further processing.

Still referring to FIG. 1, processor may be configured to generate an eligibility status 148 based on the clients and/or targets associated with the ally 176. In an embodiment, eligibility status 148 may be used to determine that a particular ally 176 is suitable for communication. In an embodiment, processor 108 may receive information such as individuals associated with the ally 176 and corresponding information about the individuals in order to determine an eligibility status 148.

Still referring to FIG. 1, determining an eligibility status 148 for each ally of the plurality of allies includes receiving a data set 120. In one or more embodiments, processor 108 is configured to receive a data set 120 having one or more of target data 124. In one or more embodiments, each target data 124 may be associated with a particular target wherein processor 108 is configured to determine a validity status 136 of each target and/or target data 124. In an embodiment, the validity status 136 may be used to determine if a particular ally 176 is eligible for processing. In one or more embodiments, processor may make one or more determinations based on data set 120 and determine an eligibility status 148 based on the receipt of data set 120. This will be described in further detail below. "Data set," for the purposes of this disclosure, is a collection of related information. Data set 120 includes a plurality of target data 124 and/or one or more sets of target data 124. "Target data," for the purposes of this disclosure, is information relating to a current or potential client that an ally 176 is associated with. Data set 120 may include compliance information. For the purposes of this disclosure, "compliance information" is data related to compliance with one or more regulations and rile. In some embodiments, compliance information may be presented to an ally in order to convey that the program adheres to the requisite rules and regulations. For example, target data 124 may include contact information associated with the target. A set of target data 124 may correspond to a particular current or potential client wherein one or more sets may be associated with one or more particular current and/or potential clients. Target data 124 may include basic background information such as age, gender, height, weight, marital status, contact information (e.g. email, phone, address etc.), address, address of residency, and the like. Target data 124 may further include assets owned by the individual (e.g. properties, homes, apartments buildings, cars, trucks, boats, airplanes, helicopters, expensive watches, jewelry, cash on hand, stocks and the like). Target data 124 may further include an individual's net worth, an individual's interest in other corporations and/or assets and the like. Target data 124 may further include an individual's current insurance plans, if any. The information pertaining to insurance plans may include price paid, the scope of the coverage, the amount being covered, the assets being covered, the policy expiration term and the like. In one or more embodiments, target data 124 may further include geographical datum 128. "Geographical datum" for the purposes of this disclosure is information relating to the location of one or more individuals or components. Geographical datum 128 may include the residency of the target, the location of one or more properties owned by the target, the location of one or more assets associated with the target and the like. In one or more embodiments, geographical datum 128 may include the geographical location of any element described within target data 124. Further disclosure on data sets 120, target data 124 and/or any other data associated with data sets and/or target data 124 may be found in Non-provisional application Ser. No. 18/231,519 filed on Aug. 8, 2023, and entitled "APPARATUS AND METHODS FOR CUSTOMIZATION AND UTILIZATION OF TARGET PROFILES," the entirety of which is incorporated herein by reference.

With continued reference to FIG. 1, target data 124 may further include any data describing one or more assets owned by the target. This may include assets within a target's home, individuals (other than the target) residing on one or more properties, individuals who may be associated with and/or may have control over one or more assets (e.g. an individual may take possession to drive a car, the individual may take control of a property, and the like). In one or more embodiments, target data 124 may further include previous accidents (e.g. car accidents, house fires, loss or damage of assets due to unforeseen circumstances, loss or damage of assets due to negligence, loss or damage of assets due to natural disasters, loss or damage of assets due to recklessness, intent, or knowledge, and the like) of each individual associated with one or more assets of the target. In one or more embodiments, target data 124 may further include the costs associated with the loss or damage of one or more assets. This may include the costs to replace, the cost to repair and the like. In one or more embodiments, target data 124 may further include costs associated with the loss or damage of assets or individuals that may be attributed to the target. This may include the damage to a vehicle as a result of negligence by the individual. This may further include, but is not limited to, loss of life or damage to another individual that may be attributed to the individual.

With continued reference to FIG. 1, target data 124 may further include assets such as a target's art, a target's jewelry and the like and information indicating if the target has covered the assets under an insurance policy and the information relating to the policy. In one or more embodiments, target data 124 may further include if a particular target employs domestic staff (e.g. security, cleaning maids, nanny's gardeners etc.) and any corresponding insurance information.

Wirth continued reference to FIG. 1, target data 124 may further include origination datum 132. "Origination datum" for the purposes of this disclosure is information relating to the source of the information within target data 124 that has been received. Origination datum 132 may include the information of the individual (also known as "originator") who retrieved target data 124. This may include but is not limited to, the name of the individual, the address, an entity associated with the individual, a unique identifier used to identify the individual and the like. In one or more embodiments, each of the plurality of target data 124 may include a separate origination datum 132. In one or more embodiments, data set 120 may include a singular origination datum 132 that describe the origin of the data set 120. As used in the current disclosure, an "entity" is an organization comprised of one or more persons with a specific purpose. An entity may include a corporation, organization, business, group one or more persons, and the like. In one or more embodiments, origination datum 132 may include information that data set originated from ally 176 or an individual associated with ally 176. In one or more embodiments, origination datum 132 may include a digital signature, wherein the digital signature may be used to ensure the origination of target data 124 and/or data set 120.

With continued reference to FIG. 1, target data 124 may further include images of one or more assets described within target data 124. For example, target data 124 may include an image of a target's home, property, and/or any other assets described within target data 124. In one or more embodiments, target data 124 may include one or more images and any other information associated with the one or more images, such as location of the assets, description of the assets and the like.

With continued reference to FIG. 1, data set 120 may include received digital files, such as digital spreadsheet, digital word document and the like. In one or more embodiments data set 120 may include a digital spreadsheet wherein the spread sheet may contain categorizations of varying elements. Such as for example, the spreadsheet may contain a column for names of each target, a column of addresses, a column for assets and the like.

With continued reference to FIG. data set 120 may include data from files or documents that have been converted in machine-encoded test using an optical character reader (OCR). For example, an end user 180 and/or a target may input digital records and/or scanned physical documents that have been converted to digital documents, wherein data set 120 may include data that have bene converted into machine readable text. In some embodiments, optical character recognition or optical character reader (OCR) includes automatic conversion of images of written (e.g., typed, handwritten, or printed text) into machine-encoded text. In one or more embodiments, recognition of at least a keyword from an image component may include one or more processes, including without limitation optical character recognition (OCR), optical word recognition, intelligent character recognition, intelligent word recognition, and the like. In one or more embodiments, OCR may recognize written text, one glyph or character at a time. In one or more embodiments, optical word recognition may recognize written text, one word at a time, for example, for languages that use a space as a word divider. In one or more embodiments, intelligent character recognition (ICR) may recognize written text one glyph or character at a time, for instance by employing machine learning processes. In one or more embodiments, intelligent word recognition (IWR) may recognize written text, one word at a time, for instance by employing machine learning processes.

Still referring to FIG. 1, in one or more embodiments, OCR may be an "offline" process, which analyses a static document or image frame. In one or more embodiments, handwriting movement analysis can be used as input for handwriting recognition. For example, instead of merely using shapes of glyphs and words, this technique may capture motions, such as the order in which segments are drawn, the direction, and the pattern of putting the pen down and lifting it. This additional information can make handwriting recognition more accurate. In one or more embodiments, this technology may be referred to as "online" character recognition, dynamic character recognition, real-time character recognition, and intelligent character recognition.

Still referring to FIG. 1, in one or more embodiments, OCR processes may employ pre-processing of image components. Pre-processing process may include without limitation de-skew, de-speckle, binarization, line removal, layout analysis or "zoning," line and word detection, script recognition, character isolation or "segmentation," and normalization. In one or more embodiments, a de-skew process may include applying a transform (e.g., homography or affine transform) to the image component to align text. In one or more embodiments, a de-speckle process may include removing positive and negative spots and/or smoothing edges. In one or more embodiments, a binarization process may include converting an image from color or greyscale to black-and-white (i.e., a binary image). Binarization may be performed as a simple way of separating text (or any other desired image component) from the background of the image component. In one or more embodiments, binarization may be required for example if an employed OCR algorithm only works on binary images. In one or more embodiments, a line removal process may include the removal of non-glyph or non-character imagery (e.g., boxes and lines). In one or more embodiments, a layout analysis or "zoning" process may identify columns, paragraphs, captions, and the like as distinct blocks. In one or more embodiments, a line and word detection process may establish a baseline for word and character shapes and separate words, if necessary. In one or more embodiments, a script recognition process may, for example in multilingual documents, identify a script allowing an appropriate OCR algorithm to be selected. In one or more embodiments, a character isolation or "segmentation" process may separate signal characters, for example, character-based OCR algorithms. In one or more embodiments, a normalization process may normalize the aspect ratio and/or scale of the image component.

Still referring to FIG. 1, in some embodiments, an OCR process will include an OCR algorithm. Exemplary OCR algorithms include matrix-matching process and/or feature extraction processes. Matrix matching may involve comparing an image to a stored glyph on a pixel-by-pixel basis. In one or more embodiments, matrix matching may also be known as "pattern matching," "pattern recognition," and/or "image correlation." Matrix matching may rely on an input glyph being correctly isolated from the rest of the image component. Matrix matching may also rely on a stored glyph being in a similar font and at the same scale as input glyph. Matrix matching may work best with typewritten text.

Still referring to FIG. 1, in some embodiments, an OCR process may include a feature extraction process. In one or more embodiments, feature extraction may decompose a glyph into features. Exemplary non-limiting features may include corners, edges, lines, closed loops, line direction, line intersections, and the like. In one or more embodiments, feature extraction may reduce dimensionality of representation and may make the recognition process computationally more efficient. In one or more embodiments, extracted feature can be compared with an abstract vector-like representation of a character, which might reduce to one or more glyph prototypes. General techniques of feature detection in computer vision are applicable to this type of OCR. In some embodiments, machine-learning process like nearest neighbor classifiers (e.g., k-nearest neighbors algorithm) can be used to compare image features with stored glyph features and choose a nearest match. OCR may employ any machine-learning process described in this disclosure, for example machine-learning processes described with reference to FIGS. 4-6. Exemplary non-limiting OCR software includes Cuneiform and Tesseract. Cuneiform is a multi-language, open-source optical character recognition system originally developed by Cognitive Technologies of Moscow, Russia. Tesseract is free OCR software originally developed by Hewlett-Packard of Palo Alto, California, United States.

Still referring to FIG. 1, in one or more embodiments, OCR may employ a two-pass approach to character recognition. The second pass may include adaptive recognition and use letter shapes recognized with high confidence on a first pass to recognize better remaining letters on the second pass. In one or more embodiments, two-pass approach may be advantageous for unusual fonts or low-quality image components where visual verbal content may be distorted. Another exemplary OCR software tool include OCRopus. OCRopus development is led by German Research Centre for Artificial Intelligence in Kaiserslautern, Germany. In one or more embodiments, OCR software may employ neural networks, for example neural networks as taught in reference to FIGS. 4, 5, and 6.

Still referring to FIG. 1, in one or more embodiments, OCR may include post-processing. For example, OCR accuracy can be increased, in one or more embodiments, if output is constrained by a lexicon. A lexicon may include a list or set of words that are allowed to occur in a document. In one or more embodiments, a lexicon may include, for instance, all the words in the English language, or a more technical lexicon for a specific field. In one or more embodiments, an output stream may be a plain text stream or file of characters. In one or more embodiments, an OCR process may preserve an original layout of visual verbal content. In one or more embodiments, near-neighbor analysis can make use of co-occurrence frequencies to correct errors, by noting that certain words are often seen together. For example, "Washington, D.C." is generally far more common in English than "Washington DOC." In one or more embodiments, an OCR process may make use of a priori knowledge of grammar for a language being recognized. For example, grammar rules may be used to help determine if a word is likely to be a verb or a noun. Distance conceptualization may be employed for recognition and classification. For example, a Levenshtein distance algorithm may be used in OCR post-processing to further optimize results.

With continued reference to FIG. 1, processor 108 may be configured to retrieve data set 120 from a database. In one or more embodiments, ally may be configured to transmit data set 120 to a database 116. Database 116 may be populated with a plurality of data sets 120, wherein a system administrator may select a particular data set 120 for processing. In one or more embodiments, the plurality of data sets 120 may be transmitted by an ally 176 or a third party such as a financial advisor, a referral agency, a referral agent, or any other individual. In one or more embodiments, a system administrator may select a particular target data 124 from a plurality of data sets 120 for processing. In one or more embodiments, data set 120 may be transmitted to a user. Transmitting may include, and without limitation, transmitting using a wired or wireless connection, direct, or indirect, and between two or more components, circuits, devices, systems, and the like, which allows for reception and/or transmittance of data and/or signal(s) therebetween. Data and/or signals therebetween may include, without limitation, electrical, electromagnetic, magnetic, video, audio, radio, and microwave data and/or signals, combinations thereof, and the like, among others. Processor 108 may transmit the data described above to database wherein the data may be accessed from database. In one or more embodiments, data set 120 may be transmitted through one or more stand-alone software and/or websites capable of transmitting information. This includes but is not limited, email software, financial software, database software and the like.

With continued reference to FIG. 1, data set 120 and/or elements thereof may be received by a chatbot system. A "chatbot system" for the purposes of this disclosure is a program configured to simulate human interaction with an end user 180 with an end user 180 in order to receive or convey information. In one or more embodiments, chatbot system may be configured to receive data set 120 and/or elements thereof through interactive questions presented to the target or the end user 180. The questions may include, but are not limited to, questions such as "What is your name?", "What is your date of birth?", "Please list any assets owned having a value of above 1,000$?" and the like. In one or more embodiments, computing device 104 may be configured to present a comment box through a user interface wherein an end user 180 may interact with the chatbot and answer the questions through input into the chat box. In one or more embodiments, questions may require selection of one or more pre-configured answers. For example, chatbot system may ask an end user 180 to select the appropriate salary range corresponding to the user, wherein the user may select the appropriate range from a list of pre-configured answers. In situations where answers are limited to limited responses, chatbot may be configured to display checkboxes wherein an end user 180 may select a box that is most associated with their answer. In one or more embodiments, chatbot may be configured to receive data set 120 or target data 124 and through an input. In one or more embodiments, each question may be assigned to a particular categorization wherein a response to the question may be assigned to the same categorization. For example, a question prompting an end user 180 to input an income may be assigned to an income categorization wherein a response from the user may also be assigned to the income categorization. In one or more embodiments, data set 120 may be received by ally 176 through a chatbot system. In one or more embodiments, the chatbot system may be configured to request information about one or more targets through chatbot system. In one or more embodiments, chatbot system may be used to answer any questions an individual may have. In one or more embodiments, processor may present chatbot system through a user interface such as any interface as described herein wherein an individual may interact with chatbot to ask questions and receive responses about any informative information. In one or more embodiments, chatbot system may be used to assist an individual in implementation of one or more steps as described herein wherein an individual may periodically request a response from chatbot that may be used to facilitate processing of the iteration.

With continued reference to FIG. 1, data set 120 may be retrieved using a web crawler. A "web crawler," as used herein, is a program that systematically browses the internet for the purpose of Web indexing. The web crawler may be seeded with platform URLs, wherein the crawler may then visit the next related URL, retrieve the content, index the content, and/or measures the relevance of the content to the topic of interest. In some embodiments, computing device 104 may generate a web crawler to compile data set 120. The web crawler may be seeded and/or trained with a reputable website, such as government websites. A web crawler may be generated by computing device 104. In some embodiments, the web crawler may be trained with information received from an end user 180 through a user interface. In some embodiments, the web crawler may be configured to generate a web query. A web query may include search criteria received from a user. For example, a user may submit a plurality of websites for the web crawler to search to extract any data suitable for data set 120. In some cases, an end user 180 may contain information on a website such as their clientele or targets, wherein the web crawler may be configured to generate target data 124 and/or data set 120 based on the given clientele received.

With continued reference to FIG. 1, processor 108 may be configured to determine a validity status 136 of the plurality of target data 124 within data set 120. "Validity status" for the purposes of this disclosure is a determination of whether a particular target associated with target data 124 may be fit for processing. For example, processor 108 may determine that a particular target would not be a good fit for processing due to empty elements. Similarly, processor 108 may determine that a target does not have enough information necessary for processing. For example, target data 124 may be missing a client's contact information wherein system administrator may not be able to ascertain the legitimacy of the client. In another non-limiting example, processor 108 may determine that a client is not fit for any insurance plans wherein the client would not be useful to the system administrator. In one or more embodiments, a validity status 136 may include information indicating whether a target is fit for processing. In one or more embodiments, the validity status 136 may include an indication of "valid" or "invalid". In one or more embodiments, validity status 136 may include numerical indications as to the validity of an end user 180 wherein a '1' may indicate the target data 124 is valid and a '0' may indicate the data is invalid. In one or more embodiments, validity status 136 may further include a determination as to why the account was invalid. For example, processor 108 may be configured to generate information indicating that a name is missing, or a particular element is missing and the like. In one or more embodiments, processor 108 may be configured to parse through data set 120 and determine the presence of one or more elements. In one or more embodiments, each element within target data 124 may be sorted and/or assigned to a particular categorization wherein processor 108 may be configured to determine the presence of an element with a particular categorization. For example, processor 108 may be configured to determine the presence of an income within an income categorization wherein absence of the income element may indicate that a particular target data 124 is invalid. Additionally or alternatively, invalid status may contain information that an income element within target data 124 is missing. In one or more embodiments, processor may be configured to receive one or more incomes associated with target data 124 in data set 120 wherein processor may be configured to determine that a particular target data 124 is invalid if the income falls below a particular threshold. In one or more embodiments, processor 108 may be configured to determine the presence of one or more elements within target data 124. In one or more embodiments, processor 108 may receive target data 124 sorted into one or more categorizations wherein processor 108 may determine a validity status 136 based on the presence of an element in each categorization. For example, processor 108 may be configured to generate an invalidity status 136 stating that a target's assets and income are missing or are too low in comparison to one or more predetermined thresholds when the categorization relating to assets or income is empty. In one or more embodiments, processor 108 may receive data set 120 and/or target data 124 in the form of a spreadsheet wherein processor 108 may determine a validity status 136 based on the presence of elements within the spreadsheet. For example, processor 108 may determine that a particular target data 124 is missing information within a particular cell, a particular column, and/or a particular row wherein processor 108 may be configured to determine that the target data 124 is invalid. In one or more embodiments, computing device 104 may inform a user such as ally 176 that one or more elements are missing from data set 120 based on validity status 136. For example, a user may be informed that a particular data set 120 is missing a name, an address, a particular financial element (e.g. income, taxes, etc.) and the like. In one or more embodiments, computing device 104 may utilize a web crawler to search for one or more missing elements within data set 120 as a function of validity status. In one or more embodiments, the web crawler may be configured to search for information that has been deemed 'invalid.' In one or more embodiments, the web crawler may be configured to search for elements of data set and/or target data 124 wherein a particular element may be searched for and input into to data set 120 and/or target data 124 for further processing.

With continued reference to FIG. 1, in one or more embodiments, validity status 136 may be based off of a persons' income, financial assets, current insurance rates and the like. For example, processor 108 may determine that a particular individual does not contain the requisite income or requisite assets suitable for processing. In one or more embodiments, processor 108 may determine the validity status 136 of a target by comparing one or more elements within target data 124 to one or more validity thresholds 140. "Validity threshold" for the purposes of this disclosure is one or more limits or requirements used to indicate whether an element within target data 124 is valid. For example, validity threshold 140 may income a particular income limit wherein a target must have a minimum income in order to be considered valid. In another non-limiting example, validity threshold 140 may include a minimum asset requirement wherein the user's assets are compared to a minimum asset value to be considered. In one or more embodiments, validity threshold 140 may include thresholds such as but not limited to, limits on geographic location, limits in income, limits on assets, limits on liabilities and any other limits or requirements that may be suitable for determining the validity status 136 of an individual. In one or more embodiments, the plurality of target data 124 may be compared to a validity threshold 140 wherein processor 108 may determine a validity status 136 based on whether a particular element satisfies or surpasses the validity threshold 140.

With continued reference to FIG. 1, processor 108 may be configured to classify the first data set 120 to one or more target categorizations. "Target categorization" for the purposes is a grouping of data within data set 120 used to identify elements within data set 120. For example, target categorization may be used to identify assets, income, liabilities, and the like within data set 120 and categorize the data into one or more target categorizations. In one or more embodiments, target categorization may include groupings such as contact information, assets, liabilities, incomes, geographic location, current insurance provider, current insurance coverage, and the like. In one or more embodiments, each element within data set 120 may be assigned to a particular target categorization. In one or more embodiments, each element with target may be assigned to a particular target categorization. In one or more embodiments, each target data 124 of the plurality of target data 124 may contain similar elements assigned to similar categorization. For example, an element within a first target data 124 may be assigned to a particular target categorization whereas an element within a second target data 124 may be assigned to the dame categorizations. Elements may be classified using a classifier such as a machine learning model. In one or more embodiments, one or more target categorizations may be used to label various elements data set 120.

With continued reference to FIG. 1, the use of a classifier to classify data set 120 to one or more target classifications enables for accurate determination of the validity of data set 120. The classification of data set 120 into target classifications allows for quick determination of validity for data set as rules may be quickly applied to particular target classifications in order to determine the validity.

With continued reference to FIG. 1, a "classifier," as used in this disclosure is a machine-learning model, such as a mathematical model, neural net, or program generated by a machine learning algorithm known as a "classification algorithm," as described in further detail below, that sorts inputs into categories or bins of data, outputting the categories or bins of data and/or labels associated therewith. Classifiers as described throughout this disclosure may be configured to output at least a datum that labels or otherwise identifies a set of data that are clustered together, found to be close under a distance metric as described below, or the like. In one or more embodiments, processor 108 may generate and train a target classifier configured to receive data set 120 and output one or more target categorizations. Processor 108 and/or another device may generate a classifier using a classification algorithm, defined as a process whereby a computing device 104 derives a classifier from training data. In one or more embodiments target classifier may use data to prioritize the order of labels within data set 120. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. A target classifier may be trained with training data correlating data set 120 to descriptor groupings such as simplifiers, multipliers, and the like. Training data may include a plurality of data sets 120 and/or target data 124 correlated to a plurality of target categorizations. In an embodiment, training data may be used to show that a particular element within data set 120 may be correlated to a particular target categorization. Training data may be received from an external computing device 104, input by a user, and/or previous iterations of processing. A target classifier may be configured to receive as input and categorize components of data set 120 to one or more target categorizations. In one or more embodiments, processor 108 and/or computing device 104 may then select any elements within data set 120 containing a similar label and/or grouping and group them together. In one or more embodiments, data set 120 may be classified using a classifier machine learning model. In one or more embodiments classifier machine learning model may be trained using training data correlating a plurality of data sets 120 correlated to a plurality of target categorizations. In an embodiment, a particular element within data set 120 may be correlated to a particular target categorization. In one or more embodiments, classifying data set 120 may include classifying data set 120 as a function of the classifier machine learning model. In one or more embodiments classifier training data may be generated through input by a user. In one or more embodiments, classifier machine learning model may be trained through user feedback wherein a user may indicate whether a particular element corresponds to a particular class. In one or more embodiments, classifier machine learning model may be trained using inputs and outputs based on previous iterations. In one or more embodiments, a user may input data set 120 and corresponding target categorizations wherein classifier machine learning model may be trained based on the input.

With continued reference to FIG. 1, computing device 104 and/or processor 108 may be configured to generate classifiers as described throughout this disclosure using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process for the purposes of this disclosure. As a non-limiting example, an initial heuristic may include a ranking of associations between inputs and elements of training data. Heuristic may include selecting some number of highest-ranking associations and/or training data elements.

With continued reference to FIG. 1, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors for the purposes of this disclosure may be scaled, such that each vector represents each attribute along an equivalent scale of values. Each vector may be "normalized," or divided by a "length" attribute, such as a length attribute/as derived using a Pythagorean norm: $l=\sqrt{\Sigma_{i=0}^{n}a_i^2}$, where $a_i$ is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values.

With continued reference to FIG. 1, processor 108 may be configured to determine a validity status 136 as a function of the target categorizations. In one or more embodiments, processor 108 may retrieve a plurality of validity thresholds 140 from a database wherein each validity threshold 140 corresponds to a particular target categorization. In one or more embodiments, processor 108 may be configured to compare elements within target data 124 to one or more validity thresholds 140 to determine a validity status 136.

With continued reference to FIG. 1, processor 108 may be configured to modify the data set 120 as a function of the validity status 136. Processor 108 may modify data set 120 by removing any target data 124 that may be considered invalid based on validity status 136. For example, processor 108 may be configured to remove target data 124 having one or more missing elements or target data 124 associated with individuals who don't meet a predetermined criterion. In one or more embodiments, data set 120 may be modified to create a modified data set 144, wherein elements within modified data set 144 may be found in data set 120 as well. In one or more embodiments, modified data set 144 may include only target data 124 that processor 108 has determined to have a validity status 136 indicating that the target is valid.

With continued reference to FIG. 1, processor 108 may be configured to determine one or more protection gaps 152 within modified data sets 144 using a gap finder module 156. "Gap finder module" for the purposes of this disclosure is one or more computing algorithms that may be used to make one or more determinations about a gap in a target's insurance coverage. In one or more embodiments gap finder module 156 may take one or more inputs, such as a data set 120 and/or target data 124 and output one or more outputs such as one or more protection gaps 152. Processor 108 and/or another computing device 104 may be configured to process one or more algorithms within gap finder module 156. "Protection gap" for the purposes of this disclosure is information indicating that a particular target's insurance coverage is limiting or does not fully cover one or more elements or aspects described within target data 124. For example, protection gap 152 may include information indicating that a particular insurance does not cover the full price of the target's car. Protection gap 152 may further include information indicating that a target's home insurance does not cover fire insurance, flood insurance, earthquake insurance and the like. Protection gap 152 may further include information indicating that a target's policy limits are too low in comparison to the target's net worth or assets. For example, a target may contain an insurance policy limit of 15,000$ but the target may have over 1 million dollars in assets. In one or more embodiments, protection gap 152 may further include information indicating that a target does not have 'gap insurance' which is additional protection that may protect a target from liability over the target's policy limit. Protection gap 152 may further include information indicating that one or more assets indicated within target data 124 may not be covered by the user. This may include a watch, newly purchased cars, newly purchased homes, and the like. In one or more embodiments, protection gap 152 may further include any determination that any element or asset indicated within target data 124 may be lacking in terms of insurance coverage.

With continued reference to FIG. 1, gap finder module 156 may be configured to receive one or more inputs such as modified data set 144, data set 120 and and/or target data 124 and output one or more protection gaps 152. Processor 108 may be configured to retrieve gap finder module 156 from database. In one or more embodiments, gap finder module 156 may include a rule-based system. "Rule-based system" also known as "rule-based engine" is a system that executes one or more rules such as, without limitations, such as a protection rule in a runtime production environment. As used in this disclosure, a "protection rule" is a pair including a set of conditions and a set of actions, wherein each condition within the set of conditions is a representation of a fact, an antecedent, or otherwise a pattern, and each action within the set of actions is a representation of a consequent. In a non-limiting example, support rule may include a condition of "when policy limit is below a target's assets" pair with an action of "generate a protection gap 152 indicating that a target's policy limit is too low." In some embodiments, rule-based engine may execute one or more protection rules on data if any conditions within one or more protection rules are met. Data may include data set 120, target data 124 and/or any other data described in this disclosure. In some embodiments, protection rule may be stored in a database as described in this disclosure. Additionally, or alternatively, rule-based engine may include an inference engine to determine a match of protection rule, where any or all elements within modified data set 144 may be represented as values for linguistic variables measuring the same. In one or more embodiments, each rule within protection rule may include a rule and a corresponding action associated with the rule. In one or more embodiments, protection rule may include a rule such as "if the asset does is not fully covered under an insurance policy" and a corresponding action indicating "generate a protection indicating that an asset is not fully covered under the insurance policy". In one or more embodiments, inference engine may be configured to determine which rule out of a plurality of rules should be executed with respect to a particular element within modified data set 144. For example, inference engine may determine that a particular rule relating to policy limits should be selected when the elements within modified data set 144 discuss a particular policy limit. Similarly, a particular rule relating to types of protection may be selected when elements within modified data set 144 indicate types of protection. In one or more embodiments, gap finder module may receive elements within modified data set 144 and/or target data 124 and make calculations using an arithmetic logic unit within computing device 104. In one or more embodiments, gap finder module may calculate the value of a target's assets, the total policy limits, the protection of the limits and the like. In one or more embodiments, gap finder module may further calculate insurance coverages associated with the asset and make determinations as a function of the calculations. For example, processor 108 may calculate or determine that a particular asset is worth 10,000$ but the insurance coverage on the asset only covers 8,000$. In one or more embodiments gap finder module 156 may include web crawlers, wherein the web crawler may be configured to parse the internet for pricing of assets indicated within target data 124. For example, web crawler may be configured to retrieve an estimate of the target's property using estimates from one or more property websites. Similarly, web crawler may be configured to search the web for the price of the target's vehicles, assets, and the like. Gap finder module 156 may then be configured to compare the price of the assets to the current insurance coverage on the asset. In one or more embodiments, gap finder module 156 may determine that a particular asset within target data 124 does not contain any insurance coverage based on a lack of coverage indicated within target data 124, wherein gap finder module 156 may output a protection gap 152 indicating a lack of coverage.

With continued reference to FIG. 1, gap finder module 156 may further receive geographical datum 128 and make one or more determinations based on a target's geographical location. In one or more embodiments, gap finder module 156 may utilize a lookup table to 'lookup' coverages that are recommended within a particular geographic data. For example, wildfire insurance in an area prone to wildfires may be recommended in comparison to wildfire insurance on an island. A "lookup table," for the purposes of this disclosure, is a data structure, such as without limitation an array of data, that maps input values to output values. A lookup table may be used to replace a runtime computation with an indexing operation or the like, such as an array indexing operation. A look-up table may be configured to pre-calculate and store data in static program storage, calculated as part of a program's initialization phase or even stored in hardware in application-specific platforms. Data within the lookup table may include recommended coverages within a particular geographic area wherein processor 108 may retrieve recommended coverages by looking up the geographic datum and receiving the corresponding recommended coverages. In one or more embodiments, data within the lookup table may be populated using web crawler, wherein processor 108 may be configured to retrieve recommended coverages from one or more websites. In one or more embodiments, gap finder module 156 may compare the recommended coverages to the current coverages that a target currently has. Gap finder module 156 may then generate one or more protection gaps 152 based on protections that are indicated in the recommended protection yet not indicated within target data 124.

With continued reference to FIG. 1, gap finder module 156 may include a protection machine learning model 160. Processor 108 and/or gap finder module 156 may use a machine learning module, such as a protection machine learning module for the purposes of this disclosure, to implement one or more algorithms or generate one or more machine-learning models, such as a protection machine learning model 160, to calculate at least one protection gap 152. However, the machine learning module is exemplary and may not be necessary to generate one or more machine learning models and perform any machine learning described herein. In one or more embodiments, one or more machine-learning models may be generated using training data. Training data may include inputs and corresponding predetermined outputs so that a machine-learning model may use correlations between the provided exemplary inputs and outputs to develop an algorithm and/or relationship that then allows machine-learning model to determine its own outputs for inputs. Training data may contain correlations that a machine-learning process may use to model relationships between two or more categories of data elements. Exemplary inputs and outputs may come from a database, such as any database described in this disclosure, or be provided by a user. In other embodiments, a machine-learning module may obtain a training set by querying a communicatively connected database that includes past inputs and outputs. Training data may include inputs from various types of databases, resources, and/or user inputs and outputs correlated to each of those inputs so that a machine-learning model may determine an output. Correlations may indicate causative and/or predictive links between data, which may be modeled as relationships, such as mathematical relationships, by machine-learning models, as described in further detail below. In one or more embodiments, training data may be formatted and/or organized by categories of data elements by, for example, associating data elements with one or more descriptors corresponding to categories of data elements. As a non-limiting example, training data may include data entered in standardized forms by persons or processes, such that entry of a given data element in a given field in a form may be mapped to one or more descriptors of categories. Elements in training data may be linked to categories by tags, tokens, or other data elements. A machine learning module, such as protection module, may be used to create protection machine learning model 160 and/or any other machine learning model using training data. Coverage machine learning model may be trained by correlated inputs and outputs of training data. Training data may be data sets 120 that have already been converted from raw data whether manually, by machine, or any other method. Protection training data 164 may be stored in a database. Protection training data 164 may also be retrieved from database. In one or more embodiments protection machine learning model 160 may be iteratively using previous inputs correlated to previous outputs. For example, processor 108 may be configured to store data set 120 from current iteration and one or more protection gaps 152 to train the machine learning model. In one or more embodiments, the machine learning model may be trained based on user input 168. For example, an end user may indicate that one or more protection gaps 152 are inaccurate wherein the machine learning model may be trained as a function of the user input 168. In one or more embodiments, the machine learning model may allow for improvements to computing device 104 such as but not limited to improvements relating to comparing data items, the ability to sort efficiently, an increase in accuracy of analytical methods and the like.

With continued reference to FIG. 1, in one or more embodiments, a machine-learning module may be generated using training data. Training data may include inputs and corresponding predetermined outputs so that machine-learning module may use the correlations between the provided exemplary inputs and outputs to develop an algorithm and/or relationship that then allows machine-learning module to determine its own outputs for inputs. Training data may contain correlations that a machine-learning process may use to model relationships between two or more categories of data elements. The exemplary inputs and outputs may come from a database, such as any database described in this disclosure, or be provided by a user such as a prospective employee, and/or an employer and the like. In other embodiments, machine-learning module may obtain a training set by querying a communicatively connected database that includes past inputs and outputs. Training data may include inputs from various types of databases, resources, and/or user inputs and outputs correlated to each of those inputs so that a machine-learning module may determine an output. Correlations may indicate causative and/or predictive links between data, which may be modeled as relationships, such as mathematical relationships, by machine-learning processes, as described in further detail below. In one or more embodiments, training data may be formatted and/or organized by categories of data elements by, for example, associating data elements with one or more descriptors corresponding to categories of data elements. As a non-limiting example, training data may include data entered in standardized forms by persons or processes, such that entry of a given data element in a given field in a form may be mapped to one or more descriptors of categories. Elements in training data may be linked to categories by tags, tokens, or other data elements.

With continued reference to FIG. 1 determining one or more protection gaps 152 may include receiving protection training data 164 comprising a plurality of target data 124 correlated to a plurality of protection gaps 152. In one or more embodiments, the plurality of target data 124 may include target data 124 of previous iterations that have been correlated to protection gaps 152 of previous iterations. In one or more embodiments, a user may input one or more sets of target data 124 correlated to one or more protection gaps 152 to begin the machine learning process, wherein processor 108 may be configured to retrieve target data 124 of future iterations and corresponding protection gaps 152 to be used as training data to train machine learning model. In some embodiments, protection training data 164 may be received from a user, third party, database, external computing device 104s, previous iterations of processing, and/or the like as described in this disclosure. protection training data 164 may further be comprised of previous iterations of protection gaps 152. Protection training data 164 may be stored in a database and/or retrieved from a database. In one or more embodiments, determining one or more protection gaps 152 includes training protection machine learning model 160 as a function of protection training data 164 and determining one or more protection gaps 152 as a function of the protection machine learning model 160.

With continued reference to FIG. 1, in one or more embodiments, determining one or more protection gaps 152 may include sorting the modified data set 144 into one or more protection categorization 172 and determining the one or more protection gaps 152 as function of the sorting. "Protection categorization" for the purposes of this disclosure is a grouping of elements within target data 124 based on the protection required. For example, personal items may require one type of insurance coverage, property and land may require another form of coverage, cars may require another form of coverage and the like. Similarly, employing domestic staff may require a differing form of coverage such as vehicle insurance. In one or more embodiments, protection categorization 172 may include groupings such as, personal items, vehicles, property, persons (e.g. life insurance for a target, workers compensation insurance for a worker, slip and fall insurance for a guest and any other insurance that may be used to cover damages that occurred to an individual) and the like. In one or more embodiments, each protection categorization 172 may be configured to satisfy a particular category of insurance that may help protect the assets of a target. This may include, but is not limited to, property insurance (e.g. properties insured from accidents such as flooding, fires, tornadoes etc.), liability insurance (e.g., damages occurred to another individual as a result of the target's negligence) and reputation insurance (e.g. risks associated with cyber-attacks, risks associated with a target's business, risks associated with employing domestic staff etc.). In one or more embodiments, processor 108 may receive a spreadsheet wherein protection categorization 172 comprises a column or row in the spread sheet and elements within the protection categorization 172 are placed within the appropriate row or column. In one or more embodiments, processor 108 may select a particular row or column associated with a particular categorization and make one or more determinations based on each row. In one or more embodiments, processor 108 and/or gap finder module 156 may use a lookup table to lookup a particular element wherein the presence of an element on the lookup table may indicate a particular protection gap 152. For example, a particular protection categorization 172 may include elements such as a bike, a motor vehicle, etc., wherein the absence of a bike on the lookup table may indicate that a protection gap 152 does not exist whereas the presence of a motor vehicle on the lookup table may indicate that a protection gap 152 does exist. In one or more embodiments, one or more protection gaps 152 may be associated with one or more protection categorizations 172 wherein the presence of an element within a particular protection categorization 172 may indicate to processor 108 to generate a protection gap 152 associated with said particular protection categorization 172. For example, the presence of an element within a vehicle protection categorization 172 may indicate to processor 108 to generate one or more protection gaps 152 associated with the vehicles grouping.

With continued reference to FIG. 1, gap finder module 156 may classify elements of data set 120 and/or modified data set 144 to one or more protection categorization 172 using a protection classifier. A protection classifier may be configured to receive as input modified data set 144 and categorize components of modified data set 144 to one or more protection categorizations 172. In one or more embodiments, processor 108 and/or computing device 104 may then select any elements within modified data set 144 containing a similar label and/or grouping and group them together. In one or more embodiments, modified data set 144 may be classified using a protection machine learning model 160. In one or more embodiments protection machine learning model 160 may be trained using protection training data 164 correlating a plurality of modified data sets 144 correlated to a plurality of protection categorizations 172. In an embodiment, a particular element within modified data set 144 may be correlated to a particular protection categorization 172. In one or more embodiments, classifying modified data set 144 may include classifying modified data set 144 as a function of the protection machine learning model 160. In one or more embodiments protection training data 164 may be generated through user input 168. In one or more embodiments, protection machine learning model 160 may be trained through user feedback wherein a user may indicate whether a particular element corresponds to a particular protection categorization 172. In one or more embodiments, protection machine learning model 160 may be trained using inputs and outputs based on previous iterations. In one or more embodiments, a user may input previous modified data sets 144 and corresponding protection categorizations 172 wherein protection machine learning model 160 may be trained based on the input. Protection training data 164 may be generated or received in any way as described in this disclosure. In one or more embodiments, gap finder module 156 and/or processor 108 may determine the presence of one or more elements within a particular protection categorization 172 and generate one or more protection gaps 152 that are associated with the protection categorization 172. In one or more embodiments, gap finder module 156 may receive one or more classified elements and output them as one or more protection gaps 152. For example, gap finder module 156 may indicate that a particular vehicle that has been categorized to a vehicle category requires some sort of insurance coverage. In one or more embodiments, the presence of a classified element may indicate that a protection gap 152 may exist. For example, the presence of a watch or a vehicle within a protection categorization 172 may indicate that protection may be needed on the watch or vehicle. In one or more embodiments, each protection categorization 172 may contain its own corresponding lookup table wherein a particular element within the lookup table may indicate a particular protection gap 152. For example, processor 108 may receive an element within a vehicle category and use a lookup table associated with the vehicle category to determine a corresponding protection gap 152. If the element exists on the lookup table, then processor 108 and/or gap finder module 156 may select the protection gap 152 associated with the element. If not, then gap finder module 156 may not return a protection gap 152 for that element. In one or more embodiments, the lookup table may include elements that generally require protection wherein gap finder module 156 may determine that an element requires protection if it is present on the lookup table. In one or more embodiments, processor 108 and/or gap finder module 156 may be configured to receive a response from a user of one or more elements that have been classified and may require protection based on one or more lookup tables. For example, processor 108 may generate a question to ask a user if a particular vehicle that has been classified currently contains insurance coverage. If the user answers yes, then processor 108 does not generate a protection gap 152. If however, the user inputs 168 that the particular element does not have protection, then processor 108 may generate a protection gap 152.

With continued reference to FIG. 1, processor 108 is configured to determine an eligibility status 148 as a function of data set 120. In one or more embodiments, processor 108 may be configured to determine an eligibility status 148 based on one or more elements within data set 120 that have been deemed as 'valid' based on the validity status 136. In an embodiment, the presence of a particular number of target data 124 that have been deemed valid may be used to determine an eligibility status 148. In one or more embodiments, processor 108 may be configured to determine a particular number of target data 124, such as for example, that have been deemed as 'valid', wherein eligibility status 148 may be determined. In one or more embodiments, eligibility status 148 may be based on protection categorization wherein a particular number of target data 124 within data set and/or modified data set may indicate eligibility status 148. For example, a particular number of targets may be associated with a particular protection categorization such as 'boats' wherein the number of targets classified to the categorization may be used to determine eligibility status 148. In an embodiment, eligibility status 148 may be used to determine if a particular ally 176 is one that is eligible for communication. In one or more embodiments, communication may include communication such as the offering of a particular product to be introduced to one or more targets associated with the ally. In one or more embodiments, eligibility status 148 may be used to determine that a particular ally 176 contains the requisite eligibility status 148 in order to offer one or more products to the targets associated with ally 176. In one or more embodiments, eligibility status 148 may be determined based on the presence of one or more protection gaps 152. In one or more embodiments, a particular protection gap 152 and/or set of protection gaps 152 within data set and/or modified data set may determine the eligibility of an ally 176. In one or more embodiments, processor may be configured to determine a particular number of a particular protection gap 152 or a particular number of overall protection gaps 152 in order to determine eligibility status 148. For example, a plurality of targets having a protection gap associated with boat insurance may be used to determine eligibility status 148. In another non limiting example, a plurality of protection gaps 152 associated with one or more protection categorizations 172 may be used to determine eligibility status 148. In one or more embodiments, eligibility status 148 may be determined based on the quantitative datum 188 received from the end user 180. In one or more embodiments, each ally may be associated with quantitative datum 188 containing a 'review' of the ally 176 wherein the review include multiple scores from multiple individuals who have rated the capabilities of the end user 180. For example, the quantitative may include multiple scores received from targets and/or fellow employees wherein each target and/or employee may input a review (e.g. a score of 1-5) wherein the ally may be associated with the reviews or the average of the reviews. In one or more embodiments, eligibility status 148 may be determined based on one or more criterion such as, for example, the validity of the targets as indicated by validity status 136 and the reviews associated with the ally as indicated by quantitative datum 188. In one or more embodiments, processor 108 may be configured to determine eligibility status 148 based on one or more criterion as described in this disclosure. In one or more embodiments, eligibility status 148 may be used to determine if a particular ally is associated with targets having a higher income, targets having particular assets as indicated within target data 124, targets requiring particular assistance such as targets having protection gaps and the like. In an embodiment, eligibility status 148 may further be used to determine if a particular ally contains the requisite knowledge, experience, communicative skills and the like as indicated by quantitative datum 188, wherein the determination may be to determine if a particular ally is suitable for communication.

With continued reference to FIG. 1, processor 108 is configured to select at least ally 176 from a plurality of allies 176 based on eligibility status 148. In one or more embodiments, processor 108 may be configured to determine eligibility status 148 using one or more criterion as described above. In one or more embodiments, processor may be configured to select multiple allies 176 that have been determined as 'eligible' following one or more determinations such as eligibility status 148 and the like. In one or more embodiment wherein a no allies within the plurality of allies are deemed 'eligible' based on the eligibility status 148, processor 108 may be configured to select the ally 176 with the highest compatibility. Compatibility may be determined based on comparison of ally 176 to one or more eligibility thresholds 192 and/or based on data set 120. For example, processor 108 may require a minimum of 50 target data 124 to be valid within target data set, wherein processor may instead select a particular ally 176 that contains the most target data that have been deemed as 'valid' based on validity status. In one or more embodiments, processor 108 may be configured to rank each ally wherein an ally ranked the highest may include an ally 176 who has surpassed one or more eligibility thresholds 192. In one or more embodiments, multiple eligibility thresholds 192 may exist wherein each eligibility threshold 192 may correspond to a differing criterion. For example, a first eligibility threshold 192 processor may be used to determine a particular quantitative datum 188 of an ally 176 wherein a second eligibility threshold 192 may be used to determine the validity of one or more sets of target data within data set 120.

With continued reference to FIG. 1, processor 108 is configured to generate an optimized communication protocol 196 as a function of the selection of at least one ally 176. "Communication protocol" for the purposes of this disclosure is a particular method of communication. For example, communication protocol may include voice over internet wherein the method of communication may include an audio call conducted over a network. In one or more embodiments, communication may include rules that allow for the exchange of information, particularly across a network. The protocol may provide the rules in which data may be transferred and how it is received. In one or more embodiments, communication protocol may allow for text-based communication wherein two individuals may communicate with one another through text. In one or more embodiments, text-based messages may be encrypted wherein intercepted communications may not be interpreted. In one or more embodiments, communication protocol may include one or more encryption processes wherein a particular communication may not be intercepted and read. In one or more embodiments, communication protocol may include a file transfer protocol wherein the file transfer protocol is designed to transfer files between a network. In one or more embodiments, communication protocol may include a post office protocol wherein the post office protocol is configured to retrieve e-mails from a server. In one or more embodiments, communication protocol may include a real-time transport protocol wherein audio, and video are retrieved and delivered in real time. In one or more embodiments, real-time transport protocol may allow for audio and/or video communication between two individuals such as end user and user. In one or more embodiments, real-time transport protocol may be used to stream audio, video and the like. In one or more embodiments, real-time transport protocol may be used for voice over internet phone (VOiP) wherein audio may be transmitted and received in real time between two communication systems. In one or more embodiments, communication protocols may include, but are not limited to Secure Reliable Transport (SRT), Real-Time Messaging Protocol (RTMP), Transmission Control Protocol (TCP), Hypertext transfer protocol secure (HTTPS) and the like. In one or more embodiments, audio and/or video may be transmitted in data packets, wherein each data packet may be transferred over a particular network. In one or more embodiments, audio and/or video may be received by a computing device 104 and segmented into multiple data packets, wherein each data packet may be transferred across a network. In one or more embodiments, data packets may also be known as "blocks", "datagrams" or "frames" depending on which particular protocol is used for transmission. In one or more embodiments, the data packets may be received from an individual and routed to a particular destination such as an IP address of another individual. In one or more embodiments, a particular audio and/or video file may be broken up into multiple data packets wherein each data packet may be transmitted independently and received independently. In one or more embodiments, transmission of data packets may result in packet loss wherein data packets are lost during transmission or congested to a point wherein the data packet is no longer useful. In one or more embodiments, processor select a particular communication protocol wherein a system administrator and an end user 180 may communicate. In one or more embodiments, communication protocol may further include any communication between one or more individuals such as, but not limited to, text-based messages, emails, phone calls, video calls, and the like. "Optimized communication protocol" for the purposes of this disclosure is information associated with particular communication protocol that has been selected as a preferred method of communication between system administrator and a selected end user 180. For example, optimized communication protocol 196 may include information indicating that a preferred method of communication includes communication such as text-based messages, emails, and the like. In an embodiment, communication between a particular selected ally and a system administrator may include communication using RTMP. In one or more embodiments, optimized communication protocol 196 may further include a temporal element. "Temporal element" for the purposes of this disclosure is information associated with time. For example, temporal element may include a period of 3 months, wherein temporal element may indicate to communicate with an ally every 3 months. In one or more embodiments, temporal element may include particular times of day to communicate with an ally 176, particular times of the month, particular periods to reach out to the client (e.g. summer, winter, fall). In one or more embodiments, temporal element may include information on how often to communicate with an ally. This may include, but is not limited to, once a day, once a month, once a year and the like. In one or more embodiments, optimized communication protocol 196 may include a ranking of particular methods of communication, wherein for example, text based message may be listed as first, audio messaging may be listed as second the like.

With continued reference to FIG. 1, optimized communication protocol 196 may be generated as function one or more elements present within Ally 176. For example, optimized communication protocol 196 may be generated based on an end user's communication preferences as indicated within ally 176. In one or more embodiments, optimized communication protocol 196 may be generated as a function of an ally's 176 age (for example, a younger individual may indicate a preference for text-based messaging), an ally's 176 geographical location (for example, time differences due to geographic location may affect when to call), an ally's 176 communication with one or more targets, wherein target data 124 may include how ally communicates with the targets. In one or more embodiments, optimized communication protocol 196 may further be generated based on the number of targets associated with the ally as indicated by data set and/or modified data 120. For example, a particular ally 176 associated with multiple targets may require communication more periodically than an ally 176 with less targets. In one or more embodiments, generation of optimized communication protocol 196 may be generated based on the availability of a system administrator. For example, system administrator may be available between 9 am-5 pm within a particular geographic location wherein processor may be configured to generate temporal elements that fall within the availability of system administrator. In one or more embodiments, system administrator may not be available during a particular time frame, wherein processor 108 may be configured to determine a particular time frame to communicate with the ally 176 that fits both the schedule of the ally 176 and the system administrator. In one or more embodiments, processor may be configured to generate an optimized communication protocol 196 for each ally wherein each optimized communication protocol 196 may not overstep over another optimized communication protocol 196. For example, processor may be configured to generate an alternative time frame to contact an ally wherein a particular optimized communication protocol 196 and another optimized communication protocol 196 have generated the same time frames. In an embodiment, processor maybe configured to generate an optimized communication protocol 196 wherein each ally contain a separate and distinct optimized communication protocol 196, such as for example, distinct times to communicate (e.g. October 22 at 8:40 EST), distinct time frames and the like.

With continued reference to FIG. 1, optimized communication protocol 196 may be generated as a function of the selection of the one or more allies and a machine learning model. In an embodiment, processor 108 may be configured to generate an optimized communication protocol 196 as a function of a machine learning model such as any machine learning model as described in this disclosure. In one or more embodiments, processor may be configured to receive ally training data having a plurality of allies correlated to a plurality of optimized communication protocols 196. In an embodiment, a particular ally may indicate a particular optimized communication protocol 196. In an embodiment, the elements within a particular ally 176 may indicate a particular optimized communication protocol 196. In one or more embodiments, ally training data may include a plurality of allies 176 correlated to a plurality of optimized communication protocols 196 associated with a plurality of time constraints. The time constraints may be time constraints due to availability of the system administrator (e.g. such as during a particular time window, time constraint such as a maximum of one communication per time and the like). In an embodiment a particular ally 176 may be associated with a particular optimized communication protocol 196 within one or more time constraints. In one or more embodiments, ally training data may be used to train an ally machine learning model. In one or more embodiments, optimized communication protocol 196 may be generated as a function of ally machine learning model. In one or more embodiments, ally training data may train ally machine learning model wherein ally training data may be reiteratively modified and/or updated following every iteration of the processing of apparatus 100. In one or more embodiments, ally machine learning model may be trained through input such as user input 168. In one or more embodiments, feedback for ally training data may be provided by an ally 176 or a system administrator. In an embodiment, ally and/or a system administrator may provide user input through a user interface such as graphical user interface as described below. In an embodiment, processor may be configured to present through a graphical user interface, a series of questions and/or statements wherein a user such as ally 176 or a system administrator may provide feedback on the optimized communication protocol 196. In an embodiment, user input 168 and/or feedback may be used to train ally training data. In an embodiment, each element of optimized communication protocol 196 may receive input wherein ally training data may contain updates to each element generated. For example, processor may be configured to receive an input with regards to a temporal element such as how often the ally should be communicated with. Processor may further be configured to receive an input on the particular communication such as texting, voice calling and the like. In an embodiment, feedback and/or input may remove a particular element from the training set, may prioritize a particular element within the training set and the like. In one or more embodiments, processor may determine that a particular output of ally machine learning model was "successful" through input by the system administrator. System administrator may provide an input following each and every communication with an ally 176. In one or more embodiments, ally training data may be classified to one or more ally cohorts. "Ally cohorts" for the purposes of this disclosure are categorizations relating to each ally 176. For example each ally 176 may be associated and/or classified to a particular ally cohort or more than one ally cohorts. Continuing, ally training data may contain elements classified to an age cohort (e.g. a subset of ally cohort) wherein inputs associated with a particular age may be correlated to outputs associated with the same age. In an embodiment, ally cohorts may include but are not limited to age, location, clientele, and the like. In in an embodiment, each ally 176 may be classified to a particular ally cohort wherein outputs of ally machine learning model are classified to the same ally cohort. In an embodiment, a particular ally who is 55 may be associated with an optimized communication protocol 196 discussing that a phone call may be the best means of communication. In an embodiment, feedback of ally training data may be associated with a particular categorization. For example, system administrator may indicate that a particular communication such as texting wasn't the right fit for a 60-year-old ally 176. As a result, ally training data relating to the particular ally cohort may be updated. In one or more embodiments, feedback and/or input may only be affected by particular categorization such as a particular ally cohort. In one or more embodiments, ally machine learning model may be trained based on inputs received for each ally cohort. In one or more embodiments, system administrator may, through a user interface, provide feedback on ally machine learning model following a communication. For example, an ally may indicate their preferred mode of communication is through text wherein system administrator may provide feedback in instances wherein ally machine learning model generated an optimized communication protocol 196 containing information that the preferred method of communication is something other than text. In one or more embodiments, ally training data may be received by a user, a $3^{rd}$ party, external computing devices and in any other way as described in this disclosure. In one or more embodiments, optimized communication protocol 196 maybe updated periodically. In one or more embodiments, each ally 176 may continuously be updated over a given period of time by system administrator, through user input and in any other way as described within this disclosure. In an embodiment, optimized communication protocol 196 to reflect the updated ally 176. In one or more embodiments, each ally 176 may be updated wherein information related to current target are input. This may include but is not limited to retention rate of clients, a number of prospects referred in both directions, the conversion ratio of those prospects to clients, a turnover rate of their enrolled financial advisors, the total dollar amount of client property and liability gaps closed, and other key metrics. this information may be used to periodically update optimized communication protocol 196 processor may determine that an ally 176 is no longer useful for engagement and/or communication based on the updated optimized communication protocol 196.

With continued reference to FIG. 1, apparatus 100 includes a graphical user interface (GUI). For the purposes of this disclosure, a "user interface" is a means by which a user and a computer system interact. For example, through the use of input devices and software. In one or more embodiments, processor 108 may be configured to modify graphical user interface as a function of the selection of an ally 176 by populating user interface data structure with data of the ally 176 and visually presenting the one ally 176 through modification of the graphical user interface. In one or more embodiments, the user interface, such as a graphical user interface as described below, may populate a user interface data structure with optimized communication protocols 196 wherein a system administrator may view the selected allies and the corresponding optimized communication protocols 196. A user interface may include graphical user interface, command line interface (CLI), menu-driven user interface, touch user interface, voice user interface (VUI), form-based user interface, any combination thereof and the like. In some embodiments, a user may interact with the user interface using a computing device 104 distinct from and communicatively connected to processor 108. For example, a smart phone, smart tablet, or laptop operated by the user and/or participant. A user interface may include one or more graphical locator and/or cursor facilities allowing a user to interact with graphical models and/or combinations thereof, for instance using a touchscreen, touchpad, mouse, keyboard, and/or other manual data entry device. A "graphical user interface," as used herein, is a user interface that allows users to interact with electronic devices through visual representations. In some embodiments, GUI 198 may include icons, menus, other visual indicators, or representations (graphics), audio indicators such as primary notation, and display information and related user controls. A menu may contain a list of choices and may allow users to select one from them. A menu bar may be displayed horizontally across the screen such as pull-down menu. When any option is clicked in this menu, then the pull-down menu may appear. A menu may include a context menu that appears only when the user performs a specific action. An example of this is pressing the right mouse button. When this is done, a menu may appear under the cursor. Files, programs, web pages and the like may be represented using a small picture in graphical user interface. Persons skilled in the art, upon reviewing the entirety of this disclosure, will be aware of various ways in which a graphical user interface and/or elements thereof may be implemented and/or used as described in this disclosure.

With continued reference to FIG. 1, apparatus 100 may further include a display device communicatively connected to at least a processor 108. "Display device" for the purposes of this disclosure is a device configured to show visual information. In one or more embodiments, display device may include a liquid crystal display (LCD), a cathode ray tube (CRT), a plasma display, a light emitting diode (LED) display, and any combinations thereof. Display device may include, but is not limited to, a smartphone, tablet, laptop, monitor, tablet, and the like. Display device may include a separate device that includes a transparent screen configured to display computer generated images and/or information. In one or more embodiments, display device may be configured to visually present one or more data through GUI 198 to a user, wherein a user may interact with the data through GUI 198. In one or more embodiments, a user may view GUI 198 through display. In one or more embodiments, processor 108 may be configured to receive data transmitted using a particular communication protocol within optimized communication protocol 196 and visually display to a user.

With continued reference to FIG. 1, GUI 198 may be configured to visually present one or more allies 176 and/or one or more optimized communication protocols 196 to a user such as system administrator. In one or more embodiments, processor may be configured to visually present only selected allies and their optimized communication protocols 196. In one or more embodiments, GUI 198 may be configured to receive input data from an end user 180 such as any information within ally 176. In one or more embodiments, GUI 198 may be configured to receive any input data as described in this disclosure. In one or more embodiments, communication protocol 196 may be used to transmit information to GUI 198. In one or more embodiments, GUI 198 may be located on a network wherein inputs within apparatus 100 may be encoded and transmitted through a particular communication protocol. GUI 198 may include any GUI 198 as described in this disclosure such as in reference to FIG. 2.

With continued reference to FIG. 1, GUI 198 may be configured to visually present the eligibility status 148 of each ally 176 through display device. In an embodiment, system administrator may be able to view the eligibility status 148 of each ally and the corresponding optimized communication protocols 196. In an embodiment, system administrator may interact with GUI 198 such as through user input wherein system administrator may modify a particular eligibility status 148. For example, system administrator may be able to modify a particular ally's 176 eligibility status from 'eligible' to not eligible and vice versa. In an embodiment, a system administrator may determine that the determinations made by processor were not entirely accurate and as a result modify the eligibility status 148 of one or more allies 148. In an embodiment, processor 108 may be configured to receive the modified eligibility statuses and make one or more determinations such as through the generation of one or more optimized communication protocols 196 for the modified eligibility statuses.

With continued reference to FIG. 1, apparatus 100 may further contain educational marketing materials such as but not limited to, client-facing videos, white papers, courses, and the like that gives one or more allies 176 information associated with their field of business. In one or more embodiments, education materials may further include market insights related to assets, liabilities, insurance and the like that help one or more allies stay informed about the industry and better advise their clients. In one or more embodiments, processor 108 may be configured to generate newsletters to be transmitted to one or more allies, wherein the newsletters contain education information that may be used to empower allies 176 with the latest information in longevity, entrepreneurism, and the future of their industry.

In one or more embodiments, processor may utilize a web crawler such as any web crawler as described above wherein the web crawler may be configured to retrieve updated education materials. In one or more embodiments, education materials may be received through input such as by a system administrator. In one or more embodiments, processor may utilize a machine learning model to retrieve data parsed by the web crawler and output relevant information. For example, the machine learning model may be configured to receive a large data set of web crawled data wherein the machine learning model may output only data that is relevant to a particular industry and/or only information that is particularly relevant. In one or more embodiments, training data containing a plurality of web crawled inputs and correlated educational outputs may be used to train machine learning model to generate educational information from the web crawled data.

With continued reference to FIG. 1, processor may be configured to continuously modify user interface as a function of one or more optimized communication protocols. In an embodiment, each communication protocol 196 may contain steps wherein each step is indicative of an element within communication protocol. 196. In an embodiment, each step may include instructions on a particular time to communicate, the particular method of communication, and the next method of communication. In an embodiment, optimized communication protocol 196 may be continuously modified and/or updated following communication. For example, system administrator may input through a user interface such as GUI 198 that communication recently occurred, wherein processor 108 may update and/or modify optimized communication protocol 196 to indicate the next time to communicate, if any. This modification may be seen as a next step within optimized communication protocol. In an embodiment, optimized communication protocol 196 may include a plurality of steps wherein each step contains the date of communication, the method of communication and the like. In an embodiment, the completion of a communication may indicate a completion of a step within optimized communication protocol 196 wherein processor may be configured to modify GUI and display the next step, wherein the next step corresponds to the next time to communicate and the preferred time to communicate. In one or more embodiments, processor may modify GUI 198 to visually present reminders, alerts and the like when a particular communication is approaching as indicated by one or more optimized communication protocols 196. For example, GUI 198 may visually present a reminder or an alarm when a communication will occur within a day, an hour, and the like. In one or more embodiments, processor receive a date and time from a real-time clock (RTC) and/or from a network wherein processor may compare the date and time to the date and time within one or more optimized communication protocols 196. In an embodiment, processor may modify GUI 198 to display the difference in time between the current time and the communication and present reminders to a system administrator of the upcoming communications.

With continued reference to FIG. 1, apparatus 100 may further include an interactive ally feature. "Interactive ally feature" for the purposes of this disclosure is a user interface feature that allows one or more allies to interact with apparatus 100. In one or more embodiments, interactive ally feature may include a communication portal wherein one or more allies may communicate with one another. The communication portal may include text-based messaging functionality, audio based communication functionalities and video based communication functionalities wherein one or more allies may communicate with one another. In one or more embodiments, one or more allies may input a comment or a datum wherein other allies may interact with the datum and provide responses. In one or more embodiments, interactive ally feature may contain information from one or more allies that may be used to improve the business of a particular 176. In one or more embodiments, interactive ally feature may allow for user input wherein one or more allies 176 may be able to input data files, wherein processor may receive the data files and populate database. In one or more embodiments, processor may generate an interactive score for each ally wherein each input may be associated with a particular interactive score. In one or more embodiments, interactive score may include a quantity of inputs may by a particular ally 176. For example, a particular ally 176 may contain an interactive score of 5, wherein the 5 denotes those 5 inputs were made by the user. In one or more embodiments, each input made by a particular ally 176 may be weighted differently wherein an interactive score of a first input may be higher or lower than an interactive score of a second input. In one or more embodiments, inputs may be rated by other allies through one or more interactive features on the user interface wherein ratings may affect the interactive score. For example, a positive rating may increase the weighting of the particular input wherein interactive score may be higher. In one or more embodiments, each ally 176 may contain interactive score based in user input. In one or more embodiments, processor may be configured to generate alerts to system administrator when a particular interactive score of a particular 176 reaches a predetermined threshold. In an embodiment, the threshold may be used to determine the quality of the inputs and make one or more determinations as a function of the inputs. In one or more embodiments, interactive Ally feature may further include educational material such as videos, text-based material, and the like. In one or more embodiments, each ally may interact with the education materials wherein each ally may view the educational materials in order to make one or more informative decisions. In one or more embodiments, each ally may input a datum associated with one or more educational materials wherein the datum may include feedback on a particular education material and/or any other information that may be useful in association with the particular education material.

In one or more embodiments, one or more allies 176 may interact with apparatus 100 wherein a particular ally may input data to receive one or more protection gaps, one or more customization modules and the like as described in this disclosure and as described in may be found in Non-provisional application Ser. No. 18/231,519 filed on Aug. 8, 2023, and entitled "APPARATUS AND METHODS FOR CUSTOMIZATION AND UTILIZATION OF TARGET PROFILES," the entirety of which is incorporated herein by reference. In one or more embodiments, each ally 176 may input data to receive one or more protection gaps, one or more customization modules and any other data described herein as outputs. In one or more embodiments, protection gaps may be used to asses potential risks of a particular target. In one or more embodiments, customization modules may be used to mitigate such risks by providing the appropriate protection and/or providing a list of appropriate protections.

With continued reference to FIG. 1, in some embodiments, apparatus 100 may be configured to interface with a client relationship management (CRM) system. A "CRM system," for the purposes of this disclosure is a system that provides for management of clients. Apparatus 100 may receive data disclosed in this disclosure from CRM system. As non-limiting examples, apparatus 100 may receive data set 120, target data 124, origination datum 132, geographical datum 128, ally 176, or the like from CRM system. In some embodiments, apparatus 100 may communicate certain data to CRM system. As non-limiting examples, apparatus 100 may send protection gaps 142, optimized communication protocol 196, eligibility status 148, quantitative datum 188, or the like to quantitative datum 188.

With continued reference to FIG. 1, in some embodiments, apparatus 100 may match a target to an ally 176. In some embodiments, this may include receiving target data 124 and matching target data 124 to ally 176. In some embodiments, target data 124 may indicate that a target does not have ally matched to them; this may prompt apparatus 100 to match target to ally 176.

With continued reference to FIG. 1, in some embodiments, matching target to ally 176 may include matching target to ally 176 using an ally matching machine-learning model. Ally matching machine-learning model may be consistent with any machine-learning model disclosed in this disclosure. Ally matching machine-learning model may be trained using a machine-learning module such as machine learning module 400 disclosed with reference to FIG. 4. Ally matching machine-learning model may be trained using ally matching training data. Ally matching training data may include sets of target data 124 correlated to allies 176. In some embodiments, ally matching training data may be iteratively updated as a function of user feedback. In some embodiments, user feedback may be included in user input 168. For example, if a particular matching of target data 124 to ally 176 receives "negative" user feedback that set may be removed from ally matching training data. For example, if a particular matching of target data 124 to ally 176 receives "negative" user feedback that set may be assigned a lower or reduced weight within ally matching training data. For example, if a particular matching of target data 124 to ally 176 receives "positive" user feedback that set may be added to ally matching training data. For example, if a particular matching of target data 124 to ally 176 receives "positive" user feedback that set may be assigned a higher or increased weight within ally matching training data.

Figure 2:
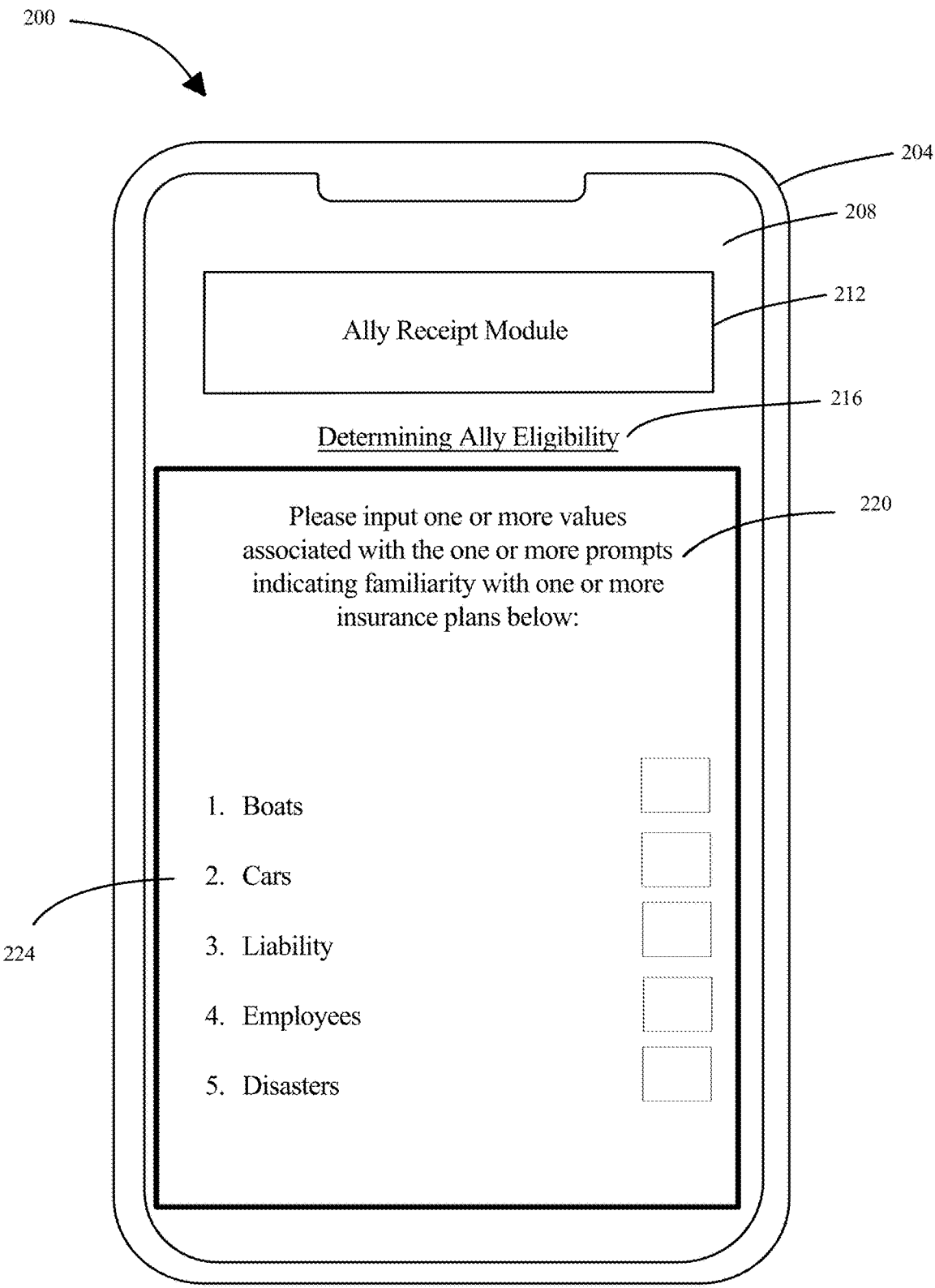
FIG. 2 is an exemplary embodiment of a graphical user interface in accordance with this disclosure.

Referring now to FIG. 2, an exemplary embodiment of a GUI 200 on a display device 204 is illustrated. GUI 200 is configured to receive the user interface structure as discussed above and visually present any data described in this disclosure. Display device 204 may include, but is not limited to, a smartphone, tablet, laptop, monitor, tablet, and the like. Display device 204 may further include a separate device that includes a transparent screen configured to display computer generated images and/or information. In one or more embodiments, GUI 200 may be displayed on a plurality of display devices. In one or more embodiments, GUI 200 may display data on separate windows 208. A "window" for the purposes of this disclosure is the information that is capable of being displayed within a border of device display. A user may navigate through different windows 208 wherein each window 208 may contain new or differing information or data. For example, a first window 208 may display information relating to receiving inputs of an ally, whereas a second window may display information relating to the matching of an ally to a target within target data as described in this disclosure. A user may navigate through a first second, third and fourth window (and so on) by interacting with GUI 200. For example, a user may select a button or a box signifying a next window on GUI 200, wherein the pressing of the button may navigate a user to another window. In one or more embodiments, GUI may further contain event handlers, wherein the placement of text within a textbox may signify to computing device to display another window. An "event handler" as used in this disclosure is a callback routine that operates asynchronously once an event takes place. Event handlers may include, without limitation, one or more programs to perform one or more actions based on user input 168, such as generating pop-up windows, submitting forms, requesting more information, and the like. For example, an event handler may be programmed to request more information or may be programmed to generate messages following a user input 168. User input 168 may include clicking buttons, mouse clicks, hovering of a mouse, input using a touchscreen, keyboard clicks, an entry of characters, entry of symbols, an upload of an image, an upload of a computer file, manipulation of computer icons, and the like. For example, an event handler may be programmed to generate a notification screen following a user input 168 wherein the notification screen notifies a user that the data was properly received. In some embodiments, an event handler may be programmed to request additional information after a first user input 168 is received. In some embodiments, an event handler may be programmed to generate a pop-up notification when a user input 168 is left blank. In some embodiments, an event handler may be programmed to generate requests based on the user input 168. In this instance, an event handler may be used to navigate a user through various windows 208 wherein each window 208 may request or display information to or from a user. In this instance, window 208 displays an identification field 212 wherein the identification field signifies to a user, the particular action/computing that will be performed by a computing device. In this instance identification field 212 contains information stating "Ally Receipt module" wherein a user may be put on notice that any information being received or displayed will be used to generate an ally or to input information associated with an ally as described in this disclosure. Identification field 212 may be consistent throughout multiple windows 208. Additionally, in this instance, window 208 may display a sub identification field 216 wherein the sub identification field may indicate to a user the type of data that is being displayed or the type of data that is being received. In this instance, sub identification field 216 contains "Determining Ally Eligibility". This may indicate to a user that computing device is receiving information associated with determining the eligibility status 148 of an ally as described above. Additionally, window 208 may contain a prompt 220 indicating the data that is being described in sub identification field 216 wherein prompt 220 is configured to display to a user the data that is currently being received and/or generated. In this instance, prompt 220 notifies a user that one or more requests to receive data is currently present in the current window 208. In this instance GUI may contain input fields 224 wherein each input field may include a statement or question and each statement may include an input box to input data associated with the statement. In one or more embodiments, the input fields 224 may be used to receive information about a particular ally and determine an eligibility status 148.

With continued reference to FIG. 2, GUI 200 may be configured to receive user feedback. For example, GUI 200 may be configured to generate one or more protection gaps wherein a user may interact with GUI 200 and provide feedback on the determined protection gaps. In one or more embodiments, a user may desire to view multiple protection gaps wherein a user may navigate back and forth through various windows to select one or more protection gaps and view any corresponding information associated with the protection gaps. In one or more embodiments, user feedback may be used to train a machine learning model as described above. In one or more embodiments, user feedback may be used to indicate computing device 104 to generate alternative protection gaps and/or target profiles 176.

Figure 3:
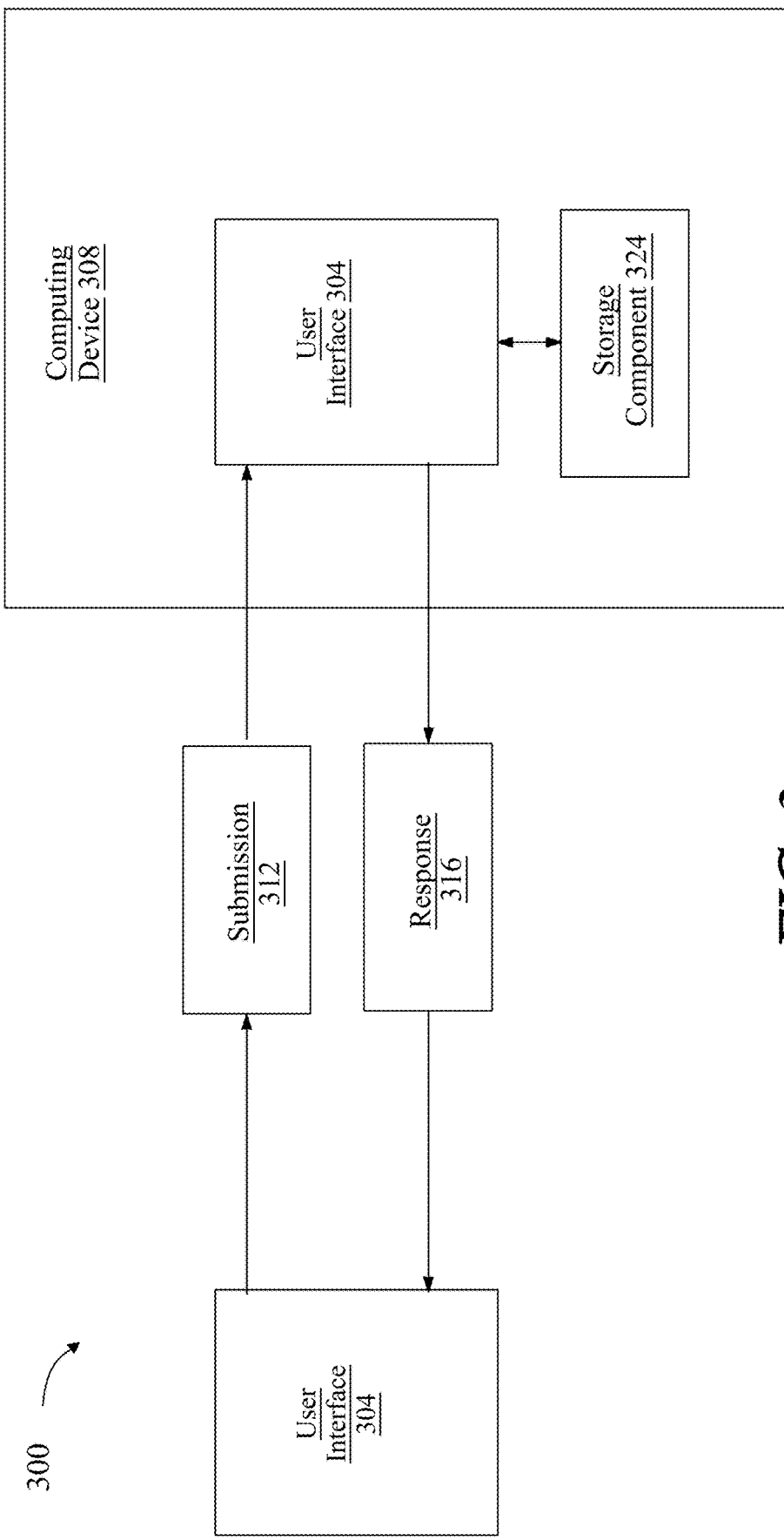
FIG. 3 is a block diagram of exemplary embodiment of a chatbot.

Referring to FIG. 3, a chatbot system 300 is schematically illustrated. According to some embodiments, a user interface 304 may be communicative with a computing device 308 that is configured to operate a chatbot. In one or more embodiments, user interface 304 may be local to computing device 308. Alternatively or additionally, in one or more embodiments, user interface 304 may remote to computing device 308 and communicative with the computing device 308, by way of one or more networks, such as without limitation the internet. Alternatively or additionally, user interface 304 may communicate with user device 308 using telephonic devices and networks, such as without limitation fax machines, short message service (SMS), or multimedia message service (MMS). Commonly, user interface 304 communicates with computing device 308 using text-based communication, for example without limitation using a character encoding protocol, such as American Standard for Information Interchange (ASCII). Typically, a user interface 304 conversationally interfaces a chatbot, by way of at least a submission 312, from the user interface 308 to the chatbot, and a response 316, from the chatbot to the user interface 304. In many cases, one or both of submission 312 and response 316 are text-based communication. Alternatively or additionally, in one or more embodiments, one or both of submission 312 and response 316 are audio-based communication.

Continuing in reference to FIG. 3, a submission 312 once received by computing device 308 operating a chatbot, may be processed by a processor 320. In some embodiments, processor 320 processes a submission 312 using one or more of keyword recognition, pattern matching, and natural language processing. In some embodiments, processor employs real-time learning with evolutionary algorithms. In one or more embodiments, processor 320 may retrieve a pre-prepared response from at least a storage component 324, based upon submission 312. Alternatively or additionally, in some embodiments, processor 320 communicates a response 316 without first receiving a submission 312, thereby initiating conversation. In one or more embodiments, processor 320 communicates an inquiry to user interface 304; and the processor is configured to process an answer to the inquiry in a following submission 312 from the user interface 304. In one or more embodiments, an answer to an inquiry present within a submission 312 from a user device 304 may be used by computing device 104 as an input to another function, such as any data described above.

Figure 4:
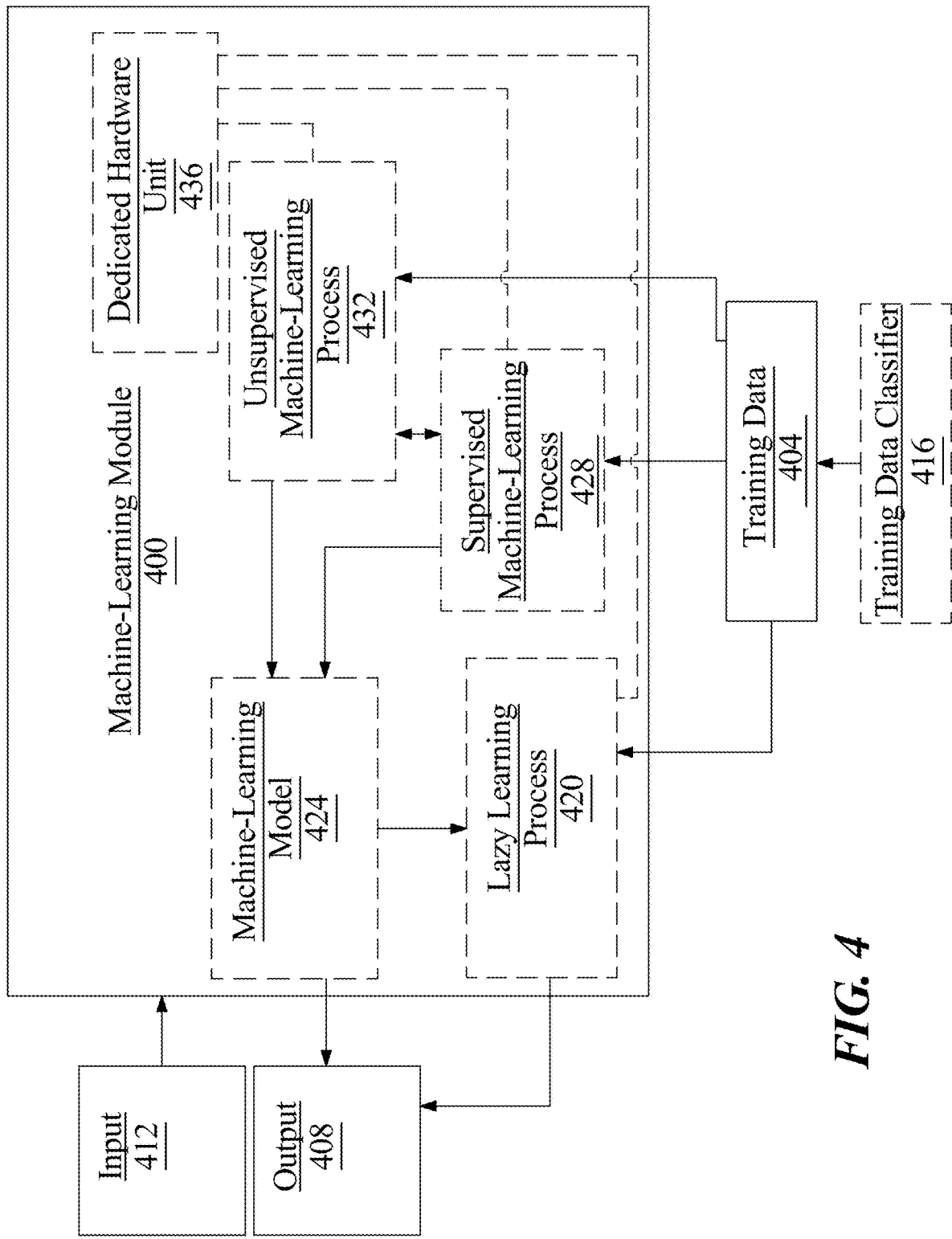
FIG. 4 is a block diagram of exemplary embodiment of a machine learning module.

Referring now to FIG. 4, an exemplary embodiment of a machine-learning module 400 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 404 to generate an algorithm instantiated in hardware or software logic, data structures, and/or functions that will be performed by a computing device/module to produce outputs 408 given data provided as inputs 412; this is in contrast to a non-machine learning software program where the commands to be executed are determined in advance by a user and written in a programming language.

Still referring to FIG. 4, "training data," as used herein, is data containing correlations that a machine-learning process may use to model relationships between two or more categories of data elements. For instance, and without limitation, training data 404 may include a plurality of data entries, also known as "training examples," each entry representing a set of data elements that were recorded, received, and/or generated together; data elements may be correlated by shared existence in a given data entry, by proximity in a given data entry, or the like. Multiple data entries in training data 404 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 404 according to various correlations; correlations may indicate causative and/or predictive links between categories of data elements, which may be modeled as relationships such as mathematical relationships by machine-learning processes as described in further detail below. Training data 404 may be formatted and/or organized by categories of data elements, for instance by associating data elements with one or more descriptors corresponding to categories of data elements. As a non-limiting example, training data 404 may include data entered in standardized forms by persons or processes, such that entry of a given data element in a given field in a form may be mapped to one or more descriptors of categories. Elements in training data 404 may be linked to descriptors of categories by tags, tokens, or other data elements; for instance, and without limitation, training data 404 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 4, training data 404 may include one or more elements that are not categorized; that is, training data 404 may not be formatted or contain descriptors for some elements of data. Machine-learning algorithms and/or other processes may sort training data 404 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 404 to be made applicable for two or more distinct machine-learning algorithms as described in further detail below. Training data 404 used by machine-learning module 400 may correlate any input data as described in this disclosure to any output data as described in this disclosure. As a non-limiting illustrative example inputs may include any inputs as described in this disclosure such as target data, ally, data set and the like and outputs may include any outputs as described in this disclosure such as protection gaps, selected allies optimized communication protocols and the like.

Further referring to FIG. 4, training data may be filtered, sorted, and/or selected using one or more supervised and/or unsupervised machine-learning processes and/or models as described in further detail below; such models may include without limitation a training data classifier 416. Training data classifier 416 may include a "classifier," which as used in this disclosure is a machine-learning model as defined below, such as a data structure representing and/or using a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. A distance metric may include any norm, such as, without limitation, a Pythagorean norm. Machine-learning module 400 may generate a classifier using a classification algorithm, defined as a processes whereby a computing device and/or any module and/or component operating thereon derives a classifier from training data 404. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 416 may classify elements of training data to classes such as one or more protection categorizations. For example, a particular element may be classified to a particular protection categorization wherein elements of training data may be correlated to elements of one or more protection gaps. In one or more embodiments, classification may allow for minimization of error within the machine learning model wherein a particular input may only be given a particular output correlated to the same class. Additionally or alternatively, a particular coverage categorization may allow for quicker processing wherein elements are first classified prior to generating a result.

With further reference to FIG. 4, training examples for use as training data may be selected from a population of potential examples according to cohorts relevant to an analytical problem to be solved, a classification task, or the like. Alternatively or additionally, training data may be selected to span a set of likely circumstances or inputs for a machine-learning model and/or process to encounter when deployed. For instance, and without limitation, for each category of input data to a machine-learning process or model that may exist in a range of values in a population of phenomena such as images, user data, process data, physical data, or the like, a computing device, processor, and/or machine-learning model may select training examples representing each possible value on such a range and/or a representative sample of values on such a range. Selection of a representative sample may include selection of training examples in proportions matching a statistically determined and/or predicted distribution of such values according to relative frequency, such that, for instance, values encountered more frequently in a population of data so analyzed are represented by more training examples than values that are encountered less frequently. Alternatively or additionally, a set of training examples may be compared to a collection of representative values in a database and/or presented to a user, so that a process can detect, automatically or via user input, one or more values that are not included in the set of training examples. Computing device, processor, and/or module may automatically generate a missing training example; this may be done by receiving and/or retrieving a missing input and/or output value and correlating the missing input and/or output value with a corresponding output and/or input value collocated in a data record with the retrieved value, provided by a user and/or other device, or the like.

Still referring to FIG. 4, computer, processor, and/or module may be configured to sanitize training data. "Sanitizing" training data, as used in this disclosure, is a process whereby training examples are removed that interfere with convergence of a machine-learning model and/or process to a useful result. For instance, and without limitation, a training example may include an input and/or output value that is an outlier from typically encountered values, such that a machine-learning algorithm using the training example will be adapted to an unlikely amount as an input and/or output; a value that is more than a threshold number of standard deviations away from an average, mean, or expected value, for instance, may be eliminated. Alternatively or additionally, one or more training examples may identified as having poor quality data, where "poor quality" is defined as having a signal to noise ratio below a threshold value.

As a non-limiting example, and with further reference to FIG. 4, images used to train an image classifier or other machine-learning model and/or process that takes images as inputs or generates images as outputs may be rejected if image quality is below a threshold value. For instance, and without limitation, computing device, processor, and/or module may perform blur detection, and eliminate one or more Blur detection may be performed, as a non-limiting example, by taking Fourier transform, or an approximation such as a Fast Fourier Transform (FFT) of the image and analyzing a distribution of low and high frequencies in the resulting frequency-domain depiction of the image; numbers of high-frequency values below a threshold level may indicate blurriness. As a further non-limiting example, detection of blurriness may be performed by convolving an image, a channel of an image, or the like with a Laplacian kernel; this may generate a numerical score reflecting a number of rapid changes in intensity shown in the image, such that a high score indicates clarity and a low score indicates blurriness. Blurriness detection may be performed using a gradient-based operator, which measures operators based on the gradient or first derivative of an image, based on the hypothesis that rapid changes indicate sharp edges in the image, and thus are indicative of a lower degree of blurriness. Blur detection may be performed using Wavelet-based operator, which takes advantage of the capability of coefficients of the discrete wavelet transform to describe the frequency and spatial content of images. Blur detection may be performed using statistics-based operators take advantage of several image statistics as texture descriptors in order to compute a focus level. Blur detection may be performed by using discrete cosine transform (DCT) coefficients in order to compute a focus level of an image from its frequency content.

Continuing to refer to FIG. 4, computing device, processor, and/or module may be configured to precondition one or more training examples. For instance, and without limitation, where a machine learning model and/or process has one or more inputs and/or outputs requiring, transmitting, or receiving a certain number of bits, samples, or other units of data, one or more training examples' elements to be used as or compared to inputs and/or outputs may be modified to have such a number of units of data. For instance, a computing device, processor, and/or module may convert a smaller number of units, such as in a low pixel count image, into a desired number of units, for instance by upsampling and interpolating. As a non-limiting example, a low pixel count image may have 100 pixels, however a desired number of pixels may be 128. Processor may interpolate the low pixel count image to convert the 100 pixels into 128 pixels. It should also be noted that one of ordinary skill in the art, upon reading this disclosure, would know the various methods to interpolate a smaller number of data units such as samples, pixels, bits, or the like to a desired number of such units. In some instances, a set of interpolation rules may be trained by sets of highly detailed inputs and/or outputs and corresponding inputs and/or outputs downsampled to smaller numbers of units, and a neural network or other machine learning model that is trained to predict interpolated pixel values using the training data. As a non-limiting example, a sample input and/or output, such as a sample picture, with sample-expanded data units (e.g., pixels added between the original pixels) may be input to a neural network or machine-learning model and output a pseudo replica sample-picture with dummy values assigned to pixels between the original pixels based on a set of interpolation rules. As a non-limiting example, in the context of an image classifier, a machine-learning model may have a set of interpolation rules trained by sets of highly detailed images and images that have been downsampled to smaller numbers of pixels, and a neural network or other machine learning model that is trained using those examples to predict interpolated pixel values in a facial picture context. As a result, an input with sample-expanded data units (the ones added between the original data units, with dummy values) may be run through a trained neural network and/or model, which may fill in values to replace the dummy values. Alternatively or additionally, processor, computing device, and/or module may utilize sample expander methods, a low-pass filter, or both. As used in this disclosure, a "low-pass filter" is a filter that passes signals with a frequency lower than a selected cutoff frequency and attenuates signals with frequencies higher than the cutoff frequency. The exact frequency response of the filter depends on the filter design. Computing device, processor, and/or module may use averaging, such as luma or chroma averaging in images, to fill in data units in between original data units In some embodiments, and with continued reference to FIG. 4, computing device, processor, and/or module may down-sample elements of a training example to a desired lower number of data elements. As a non-limiting example, a high pixel count image may have 256 pixels, however a desired number of pixels may be 128. Processor may downsample the high pixel count image to convert the 256 pixels into 128 pixels. In some embodiments, processor may be configured to perform downsampling on data. Downsampling, also known as decimation, may include removing every Nth entry in a sequence of samples, all but every Nth entry, or the like, which is a process known as "compression," and may be performed, for instance by an N-sample compressor implemented using hardware or software. Anti-aliasing and/or anti-imaging filters, and/or low-pass filters, may be used to clean up side-effects of compression.

Still referring to FIG. 4, machine-learning module 400 may be configured to perform a lazy-learning process 420 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 404. Heuristic may include selecting some number of highest-ranking associations and/or training data 404 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 4, machine-learning processes as described in this disclosure may be used to generate machine-learning models 424. A "machine-learning model," as used in this disclosure, is a data structure representing and/or instantiating a mathematical and/or algorithmic representation of a relationship between inputs and outputs, as generated using any machine-learning process including without limitation any process as described above, and stored in memory; an input is submitted to a machine-learning model 424 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 424 may be generated by creating an artificial neural network, such as a convolutional neural network comprising an input layer of nodes, one or more intermediate layers, and an output layer of nodes. Connections between nodes may be created via the process of "training" the network, in which elements from a training data 404 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 4, machine-learning algorithms may include at least a supervised machine-learning process 428. At least a supervised machine-learning process 428, as defined herein, include algorithms that receive a training set relating a number of inputs to a number of outputs, and seek to generate one or more data structures representing and/or instantiating one or more mathematical relations relating inputs to outputs, where each of the one or more mathematical relations is optimal according to some criterion specified to the algorithm using some scoring function. For instance, a supervised learning algorithm may include target as described above as inputs, protection gap as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 404. Persons skilled in the art, upon reviewing the entirety of this disclosure, will be aware of various possible variations of at least a supervised machine-learning process 428 that may be used to determine relation between inputs and outputs. Supervised machine-learning processes may include classification algorithms as defined above.

With further reference to FIG. 4, training a supervised machine-learning process may include, without limitation, iteratively updating coefficients, biases, weights based on an error function, expected loss, and/or risk function. For instance, an output generated by a supervised machine-learning model using an input example in a training example may be compared to an output example from the training example; an error function may be generated based on the comparison, which may include any error function suitable for use with any machine-learning algorithm described in this disclosure, including a square of a difference between one or more sets of compared values or the like. Such an error function may be used in turn to update one or more weights, biases, coefficients, or other parameters of a machine-learning model through any suitable process including without limitation gradient descent processes, least-squares processes, and/or other processes described in this disclosure. This may be done iteratively and/or recursively to gradually tune such weights, biases, coefficients, or other parameters. Updating may be performed, in neural networks, using one or more back-propagation algorithms. Iterative and/or recursive updates to weights, biases, coefficients, or other parameters as described above may be performed until currently available training data is exhausted and/or until a convergence test is passed, where a "convergence test" is a test for a condition selected as indicating that a model and/or weights, biases, coefficients, or other parameters thereof has reached a degree of accuracy. A convergence test may, for instance, compare a difference between two or more successive errors or error function values, where differences below a threshold amount may be taken to indicate convergence. Alternatively or additionally, one or more errors and/or error function values evaluated in training iterations may be compared to a threshold.

Still referring to FIG. 4, a computing device, processor, and/or module may be configured to perform method, method step, sequence of method steps and/or algorithm described in reference to this figure, in any order and with any degree of repetition. For instance, a computing device, processor, and/or module may be configured to perform a single step, sequence and/or algorithm repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. A computing device, processor, and/or module may perform any step, sequence of steps, or algorithm in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Further referring to FIG. 4, machine learning processes may include at least an unsupervised machine-learning processes 432. An unsupervised machine-learning process, as used herein, is a process that derives inferences in datasets without regard to labels; as a result, an unsupervised machine-learning process may be free to discover any structure, relationship, and/or correlation provided in the data. Unsupervised processes 432 may not require a response variable; unsupervised processes 432 may be used to find interesting patterns and/or inferences between variables, to determine a degree of correlation between two or more variables, or the like.

Still referring to FIG. 4, machine-learning module 400 may be designed and configured to create a machine-learning model 424 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 4, machine-learning algorithms may include, without limitation, linear discriminant analysis. Machine-learning algorithm may include quadratic discriminant analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized trees, AdaBoost, gradient tree boosting, and/or voting classifier methods. Machine-learning algorithms may include neural net algorithms, including convolutional neural net processes.

Still referring to FIG. 4, a machine-learning model and/or process may be deployed or instantiated by incorporation into a program, apparatus, system and/or module. For instance, and without limitation, a machine-learning model, neural network, and/or some or all parameters thereof may be stored and/or deployed in any memory or circuitry. Parameters such as coefficients, weights, and/or biases may be stored as circuit-based constants, such as arrays of wires and/or binary inputs and/or outputs set at logic "1" and "0" voltage levels in a logic circuit to represent a number according to any suitable encoding system including twos complement or the like or may be stored in any volatile and/or non-volatile memory. Similarly, mathematical operations and input and/or output of data to or from models, neural network layers, or the like may be instantiated in hardware circuitry and/or in the form of instructions in firmware, machine-code such as binary operation code instructions, assembly language, or any higher-order programming language. Any technology for hardware and/or software instantiation of memory, instructions, data structures, and/or algorithms may be used to instantiate a machine-learning process and/or model, including without limitation any combination of production and/or configuration of non-reconfigurable hardware elements, circuits, and/or modules such as without limitation ASICs, production and/or configuration of reconfigurable hardware elements, circuits, and/or modules such as without limitation FPGAs, production and/or of non-reconfigurable and/or configuration non-rewritable memory elements, circuits, and/or modules such as without limitation non-rewritable ROM, production and/or configuration of reconfigurable and/or rewritable memory elements, circuits, and/or modules such as without limitation rewritable ROM or other memory technology described in this disclosure, and/or production and/or configuration of any computing device and/or component thereof as described in this disclosure. Such deployed and/or instantiated machine-learning model and/or algorithm may receive inputs from any other process, module, and/or component described in this disclosure, and produce outputs to any other process, module, and/or component described in this disclosure.

Continuing to refer to FIG. 4, any process of training, retraining, deployment, and/or instantiation of any machine-learning model and/or algorithm may be performed and/or repeated after an initial deployment and/or instantiation to correct, refine, and/or improve the machine-learning model and/or algorithm. Such retraining, deployment, and/or instantiation may be performed as a periodic or regular process, such as retraining, deployment, and/or instantiation at regular elapsed time periods, after some measure of volume such as a number of bytes or other measures of data processed, a number of uses or performances of processes described in this disclosure, or the like, and/or according to a software, firmware, or other update schedule. Alternatively or additionally, retraining, deployment, and/or instantiation may be event-based, and may be triggered, without limitation, by user inputs indicating sub-optimal or otherwise problematic performance and/or by automated field testing and/or auditing processes, which may compare outputs of machine-learning models and/or algorithms, and/or errors and/or error functions thereof, to any thresholds, convergence tests, or the like, and/or may compare outputs of processes described herein to similar thresholds, convergence tests or the like. Event-based retraining, deployment, and/or instantiation may alternatively or additionally be triggered by receipt and/or generation of one or more new training examples; a number of new training examples may be compared to a preconfigured threshold, where exceeding the preconfigured threshold may trigger retraining, deployment, and/or instantiation.

Still referring to FIG. 4, retraining and/or additional training may be performed using any process for training described above, using any currently or previously deployed version of a machine-learning model and/or algorithm as a starting point. Training data for retraining may be collected, preconditioned, sorted, classified, sanitized or otherwise processed according to any process described in this disclosure. Training data may include, without limitation, training examples including inputs and correlated outputs used, received, and/or generated from any version of any system, module, machine-learning model or algorithm, apparatus, and/or method described in this disclosure; such examples may be modified and/or labeled according to user feedback or other processes to indicate desired results, and/or may have actual or measured results from a process being modeled and/or predicted by system, module, machine-learning model or algorithm, apparatus, and/or method as "desired" results to be compared to outputs for training processes as described above.

Redeployment may be performed using any reconfiguring and/or rewriting of reconfigurable and/or rewritable circuit and/or memory elements; alternatively, redeployment may be performed by production of new hardware and/or software components, circuits, instructions, or the like, which may be added to and/or may replace existing hardware and/or software components, circuits, instructions, or the like.

Further referring to FIG. 4, one or more processes or algorithms described above may be performed by at least a dedicated hardware unit 436. A "dedicated hardware unit," for the purposes of this figure, is a hardware component, circuit, or the like, aside from a principal control circuit and/or processor performing method steps as described in this disclosure, that is specifically designated or selected to perform one or more specific tasks and/or processes described in reference to this figure, such as without limitation preconditioning and/or sanitization of training data and/or training a machine-learning algorithm and/or model.

A dedicated hardware unit 436 may include, without limitation, a hardware unit that can perform iterative or massed calculations, such as matrix-based calculations to update or tune parameters, weights, coefficients, and/or biases of machine-learning models and/or neural networks, efficiently using pipelining, parallel processing, or the like; such a hardware unit may be optimized for such processes by, for instance, including dedicated circuitry for matrix and/or signal processing operations that includes, e.g., multiple arithmetic and/or logical circuit units such as multipliers and/or adders that can act simultaneously and/or in parallel or the like. Such dedicated hardware units 436 may include, without limitation, graphical processing units (GPUs), dedicated signal processing modules, FPGA or other reconfigurable hardware that has been configured to instantiate parallel processing units for one or more specific tasks, or the like. A computing device, processor, apparatus, or module may be configured to instruct one or more dedicated hardware units 436 to perform one or more operations described herein, such as evaluation of model and/or algorithm outputs, one-time or iterative updates to parameters, coefficients, weights, and/or biases, and/or any other operations such as vector and/or matrix operations as described in this disclosure.

Figure 5:
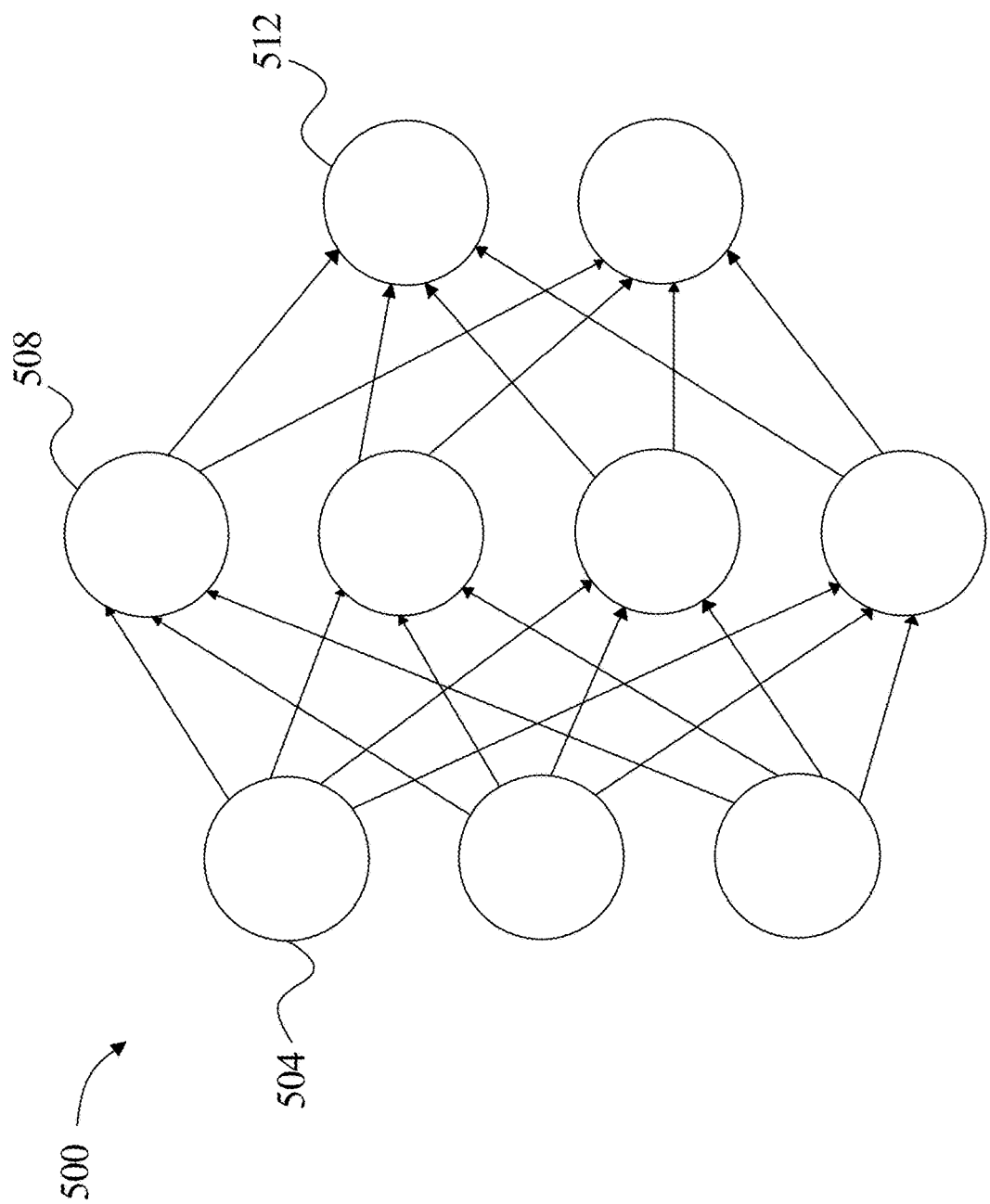
FIG. 5 is a diagram of an exemplary embodiment of a neural network.

Referring now to FIG. 5, an exemplary embodiment of neural network 500 is illustrated. A neural network 500 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 504, one or more intermediate layers 508, and an output layer of nodes 512. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network, or may feed outputs of one layer back to inputs of the same or a different layer in a "recurrent network." As a further non-limiting example, a neural network may include a convolutional neural network comprising an input layer of nodes, one or more intermediate layers, and an output layer of nodes. A "convolutional neural network," as used in this disclosure, is a neural network in which at least one hidden layer is a convolutional layer that convolves inputs to that layer with a subset of inputs known as a "kernel," along with one or more additional layers such as pooling layers, fully connected layers, and the like.

Figure 6:
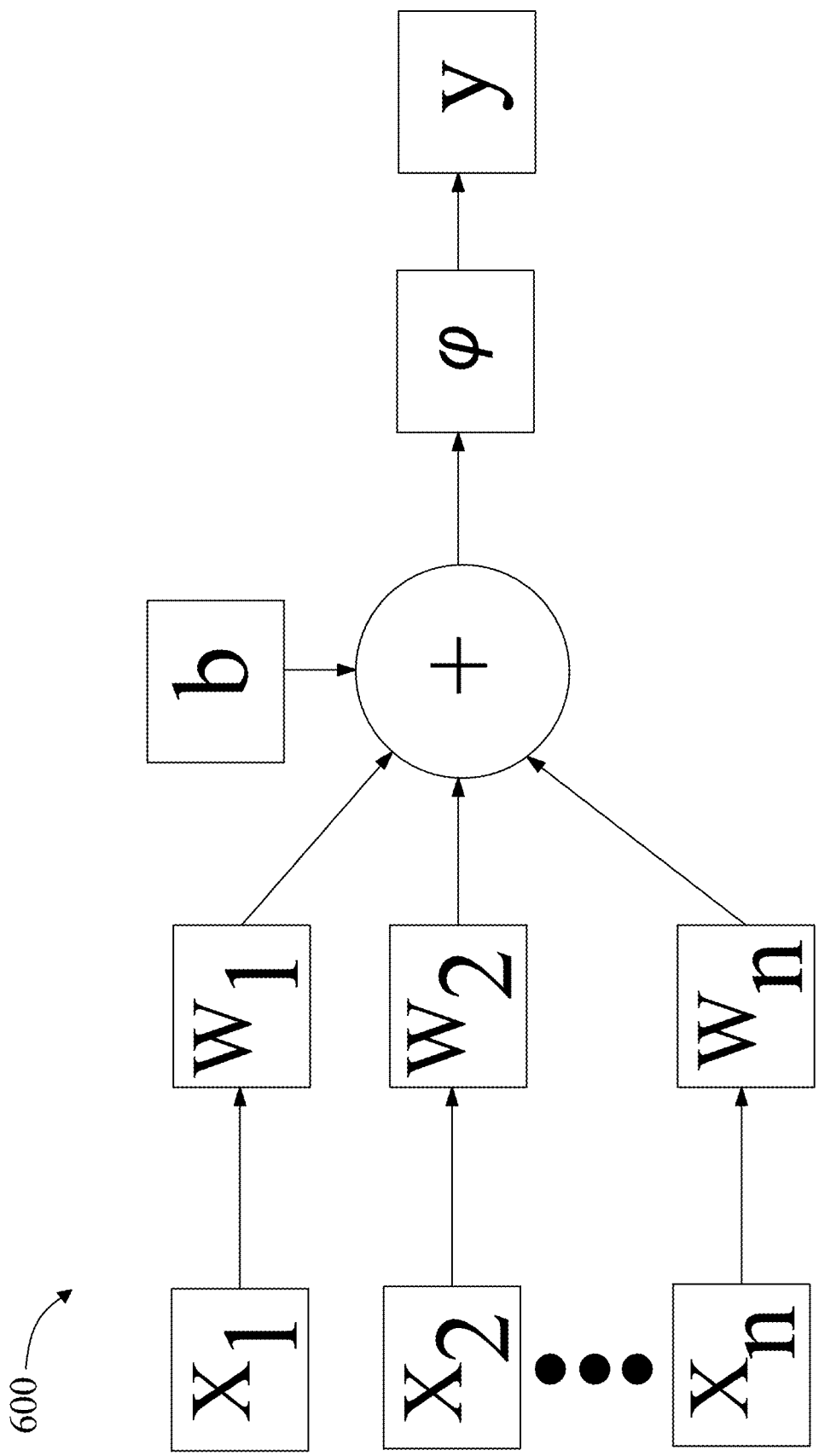
FIG. 6 is a block diagram of an exemplary embodiment of a node of a neural network.

Referring now to FIG. 6, an exemplary embodiment of a node 600 of a neural network is illustrated. A node may include, without limitation a plurality of inputs $x_i$ that may receive numerical values from inputs to a neural network containing the node and/or from other nodes. Node may perform one or more activation functions to produce its output given one or more inputs, such as without limitation computing a binary step function comparing an input to a threshold value and outputting either a logic 1 or logic 0 output or something equivalent, a linear activation function whereby an output is directly proportional to the input, and/or a non-linear activation function, wherein the output is not proportional to the input. Non-linear activation functions may include, without limitation, a sigmoid function of the form $$f(x) = \frac{1}{1-e^{-x}}$$

given input x, a tanh (hyperbolic tangent) function, of the form $$\frac{e^x - e^{-x}}{e^x + e^{-x}},$$

a tanh derivative function such as $f(x)=\tanh^2(x)$, a rectified linear unit function such as f (x)=max (0, x), a "leaky" and/or "parametric" rectified linear unit function such as f (x)=max (ax, x) for some a, an exponential linear units function such as $$f(x) = \begin{cases} x \text{ for } x \geq 0 \\ \alpha(e^x - 1) \text{ for } x < 0 \end{cases}$$

for some value of α (this function may be replaced and/or weighted by its own derivative in some embodiments), a softmax function such as $$f(x_i) = \frac{e^x}{\sum_i x_i}$$

where the inputs to an instant layer are $x_i$, a swish function such as f (x)=x*sigmoid(x), a Gaussian error linear unit function such as $$f(x) = a\left(1 + \tanh\left(\sqrt{2/\pi}\,(x + bx^r)\right)\right)$$

for some values of a, b, and r, and/or a scaled exponential linear unit function such as $$f(x) = \lambda \begin{cases} \alpha(e^x - 1) \text{ for } x < 0 \\ x \text{ for } x \geq 0 \end{cases}.$$

Fundamentally, there is no limit to the nature of functions of inputs $x_i$ that may be used as activation functions. As a non-limiting and illustrative example, node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function φ, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above.

Figure 7:
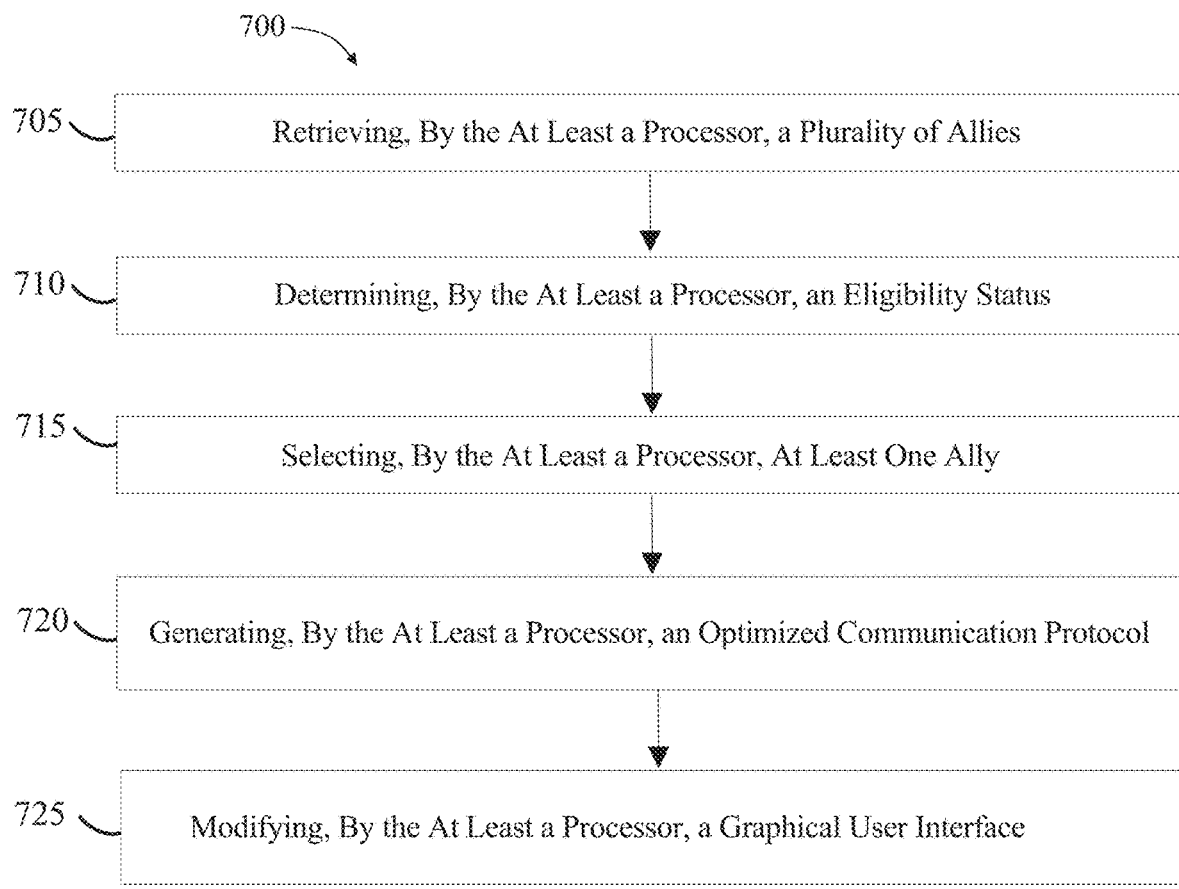
FIG. 7 is a flow diagram illustrating an exemplary embodiment of a method for generating communication protocols associated with one or more data sets.

With continued reference to FIG. 7, at step 705, method 700 includes retrieving, by the at least a processor, a plurality of allies from the database. In some cases, retrieving the plurality of allies from the database further includes receiving at least one ally from the end user and transmitting the at least one ally to a database. In some cases, receiving the at least one ally from the end user includes receiving a quantitative datum from the end user. In some cases, the quantitative datum is representative of a plurality of numerical elements, wherein each numerical element is associated with one of the one or more sets of target data. This may be implemented with reference to FIGS. 1-6 and without limitation.

With continued reference to FIG. 7, at step 710 method 700 includes determining an eligibility status of each ally of the plurality of allies. In one or more embodiments, determining an eligibility status includes receiving a data set comprising one or more sets of target data and determining an eligibility status as a function of the data set. In some cases. In some cases, wherein receiving the data set further includes determining a validity status of the plurality of target data within the data set and modifying the data set as a function of the validity status. In some cases, receiving the data set further includes determining one or more protection gaps within the modified data set using a gap finder module. In some cases, determining the eligibility status as a function of the data set includes determining the eligibility status as a function of the one or more protection gaps. In some cases, determining an eligibility status of each ally of the plurality of allies further includes comparing the quantitative datum to one or more eligibility thresholds. This may be implemented with reference to FIGS. 1-6 and without limitation.

With continued reference to FIG. 7, at step 715, method 700 includes selecting, by the at least a processor, at least one ally of the plurality of allies for each target data as a function of the eligibility status. In one or more embodiments, selection selecting by the at least a processor, at least one ally of the plurality of allies for each target fata as a function of a machine learning model. In some cases, machine learning model may include classifying the target data within data set. This may be implemented with reference to FIGS. 1-6 and without limitation.

With continued reference to FIG. 7, at step 720, method 700 includes generating, by the at least a processor, an optimized communication protocol as a function of the selection using a machine learning model. In one or more embodiments, optimized communication protocol may include a temporal element. In some cases, generating by the at least a processor, an optimized communication protocol as a function of the selection using a machine learning model further includes receiving ally training data having a plurality of allies correlated to a plurality of optimized communication protocols, training an ally machine learning model as a function of the ally training data and generating an optimized communication protocol as a function of the ally machine learning model. In some cases, ally training data may be updated as a function of user input through the graphical user interface. This may be implemented with reference to FIGS. 1-6 and without limitation.

With continued reference to FIG. 7, at step 725, method 700 includes modifying by the at least a processor, a graphical user interface as a function of the selection and the optimized communication protocol wherein modification of the graphical user interface includes visually presenting a step associated with the optimized communication protocol. This may be implemented with reference to FIGS. 1-6 and without limitation.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 8:
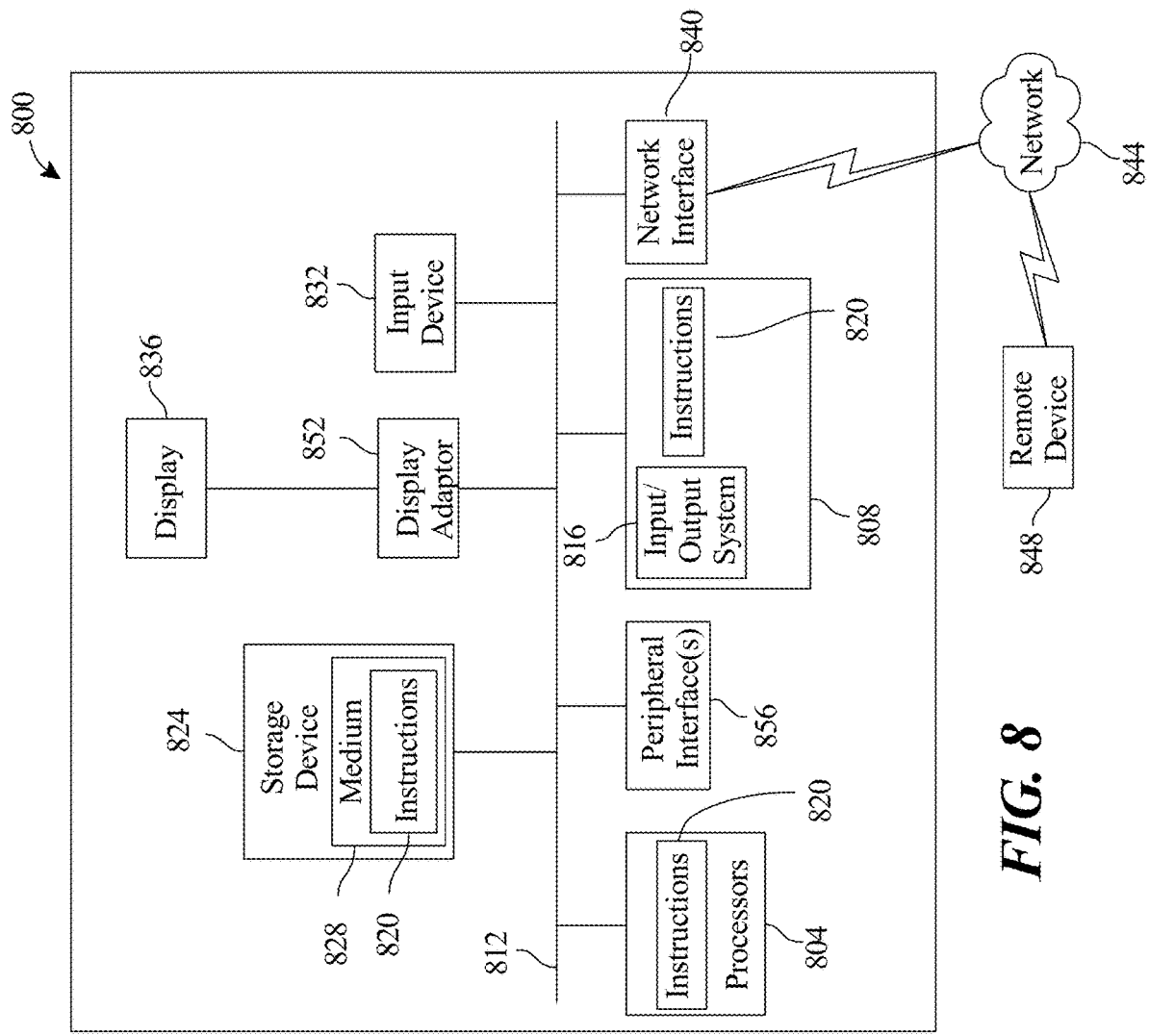
FIG. 8 is a block diagram of a computing system that can be used to implement any one or more of the methodologies disclosed herein and any one or more portions thereof.

FIG. 8 shows a diagrammatic representation of one embodiment of a computing device in the exemplary form of a computer system 800 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 800 includes a processor 804 and a memory 808 that communicate with each other, and with other components, via a bus 812. Bus 812 may include any of several types of bus structures including, but not limited to, a memory bus, a memory controller, a peripheral bus, a local bus, and any combinations thereof, using any of a variety of bus architectures.

Processor 804 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 804 may be organized according to Von Neumann and/or Harvard architecture as a non-limiting example. Processor 804 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), system on module (SOM), and/or system on a chip (SoC).

Memory 808 may include various components (e.g., machine-readable media) including, but not limited to, a random-access memory component, a read only component, and any combinations thereof. In one example, a basic input/output system 816 (BIOS), including basic routines that help to transfer information between elements within computer system 800, such as during start-up, may be stored in memory 808. Memory 808 may also include (e.g., stored on one or more machine-readable media) instructions (e.g., software) 820 embodying any one or more of the aspects and/or methodologies of the present disclosure. In another example, memory 808 may further include any number of program modules including, but not limited to, an operating system, one or more application programs, other program modules, program data, and any combinations thereof.

Computer system 800 may also include a storage device 824. Examples of a storage device (e.g., storage device 824) include, but are not limited to, a hard disk drive, a magnetic disk drive, an optical disc drive in combination with an optical medium, a solid-state memory device, and any combinations thereof. Storage device 824 may be connected to bus 812 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 824 (or one or more components thereof) may be removably interfaced with computer system 800 (e.g., via an external port connector (not shown)). Particularly, storage device 824 and an associated machine-readable medium 828 may provide nonvolatile and/or volatile storage of machine-readable instructions, data structures, program modules, and/or other data for computer system 800. In one example, software 820 may reside, completely or partially, within machine-readable medium 828. In another example, software 820 may reside, completely or partially, within processor 804.

Computer system 800 may also include an input device 832. In one example, a user of computer system 800 may enter commands and/or other information into computer system 800 via input device 832. Examples of an input device 832 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 832 may be interfaced to bus 812 via any of a variety of interfaces (not shown) including, but not limited to, a serial interface, a parallel interface, a game port, a USB interface, a FIREWIRE interface, a direct interface to bus 812, and any combinations thereof. Input device 832 may include a touch screen interface that may be a part of or separate from display 836, discussed further below. Input device 832 may be utilized as a user selection device for selecting one or more graphical representations in a graphical interface as described above.

A user may also input commands and/or other information to computer system 800 via storage device 824 (e.g., a removable disk drive, a flash drive, etc.) and/or network interface device 840. A network interface device, such as network interface device 840, may be utilized for connecting computer system 800 to one or more of a variety of networks, such as network 844, and one or more remote devices 848 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 844, may employ a wired and/or a wireless mode of communication. In general, any network topology may be used. Information (e.g., data, software 820, etc.) may be communicated to and/or from computer system 800 via network interface device 840.

Computer system 800 may further include a video display adapter 852 for communicating a displayable image to a display device, such as display device 836. Examples of a display device include, but are not limited to, a liquid crystal display (LCD), a cathode ray tube (CRT), a plasma display, a light emitting diode (LED) display, and any combinations thereof. Display adapter 852 and display device 836 may be utilized in combination with processor 804 to provide graphical representations of aspects of the present disclosure. In addition to a display device, computer system 800 may include one or more other peripheral output devices including, but not limited to, an audio speaker, a printer, and any combinations thereof. Such peripheral output devices may be connected to bus 812 via a peripheral interface 856. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, Apparatuses, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An apparatus for communication associated with one or more data sets, the apparatus comprising:
   a processor; and
   a memory communicatively connected to the processor, the memory containing instructions configuring the processor to:
      retrieve a plurality of allies from a database;
      determine an eligibility status of each ally of the plurality of allies, comprising:
         receiving a data set comprising one or more sets of target data, wherein receiving the data set further comprises:
            determining a validity status of the one or more sets of target data;
            modifying the data set as a function of the validity status;
            determining one or more protection gaps within the modified data set using a gap finder module; and
         determining an eligibility status as a function of the data set;
      select at least one ally of the plurality of allies as a function of the eligibility status;
      generate an optimized communication protocol as a function of the selection; and
      modify a graphical user interface as a function of the selection and the optimized communication protocol, wherein modification of the graphical user interface comprises, visually presenting a step associated with the optimized communication protocol.

2. The apparatus of claim 1, wherein determining the eligibility status as a function of the data set comprises determining the eligibility status as a function of the one or more protection gaps.

3. The apparatus of claim 2, wherein retrieving the plurality of allies from the database further comprises:
   receiving at least one ally from an end user; and
   transmitting the at least one ally to the database.

4. The apparatus of claim 3, wherein receiving at least one ally from the end user comprises receiving a quantitative datum from the end user.

5. The apparatus of claim 4, wherein determining an eligibility status of each ally of the plurality of allies further comprises comparing the quantitative datum to one or more eligibility thresholds.

6. The apparatus of claim 4, wherein the quantitative datum is representative of a plurality of numerical elements, wherein each numerical element is associated with one of the one or more sets of target data.

7. The apparatus of claim 1, wherein generating an optimized communication protocol as a function of the selection using a machine learning model further comprises;
   receiving ally training data comprising a plurality of allies correlated to a plurality of optimized communication protocols;
   training an ally machine learning model as a function of the ally training data; and
   generating an optimized communication protocol as a function of the ally machine learning model.

8. The apparatus of claim 7, wherein the ally training data is updated as a function of user input through the graphical user interface.

9. A method for communication associated with one or more data sets, the method comprising:
   retrieving, by at least a processor, a plurality of allies from a database;
   determining, by the at least a processor, an eligibility status of each ally of the plurality of allies comprising:
      receiving a data set comprising one or more sets of target data, wherein receiving the data set further comprises:
         determining a validity status of the one or more sets of target data;
         modifying the data set as a function of the validity status;
         determining one or more protection gaps within the modified data set using a gap finder module; and
      determining an eligibility status as a function of the data set;
   selecting, by the at least a processor, at least one ally of the plurality of allies as a function of the eligibility status;
   generating, by the at least a processor, an optimized communication protocol as a function of the selection; and
   modifying, by the at least a processor, a graphical user interface as a function of the selection and the optimized communication protocol wherein modification of the graphical user interface comprises, visually presenting a step associated with the optimized communication protocol.

10. The method of claim 9, wherein determining the eligibility status as a function of the data set comprises determining the eligibility status as a function of the one or more protection gaps.

11. The method of claim 10, wherein retrieving, by the at least a processor, the plurality of allies from the database further comprises:
    receiving at least one ally from an end user; and
    transmitting the at least one ally to the database.

12. The method of claim 11, wherein receiving the at least one ally from the end user comprises receiving a quantitative datum from the end user.

13. The method of claim 12, wherein determining an eligibility status of each ally of the plurality of allies further comprises comparing the quantitative datum to one or more eligibility thresholds.

14. The method of claim 12, wherein the quantitative datum is representative of a plurality of numerical elements, wherein each numerical element is associated with one of the one or more sets of target data.

15. The method of claim 9, wherein generating by the at least a processor, an optimized communication protocol as a function of the selection using a machine learning model further comprises;
    receiving ally training data comprising a plurality of allies correlated to a plurality of optimized communication protocols;

training an ally machine learning model as a function of the ally training data; and generating an optimized communication protocol as a function of the ally machine learning model.

16. The method of claim 15, wherein the ally training data is updated as a function of user input through the graphical user interface.

* * * * *